United States Patent
Yoon et al.

(10) Patent No.: US 12,016,018 B2
(45) Date of Patent: Jun. 18, 2024

(54) METHOD FOR TRANSMITTING OR RECEIVING CHANNEL STATE INFORMATION-REFERENCE SIGNAL IN UNLICENSED BAND, AND DEVICE THEREFOR

(71) Applicant: LG ELECTRONICS INC., Seoul (KR)

(72) Inventors: Sukhyon Yoon, Seoul (KR); Seonwook Kim, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 440 days.

(21) Appl. No.: 17/286,990

(22) PCT Filed: Oct. 31, 2019

(86) PCT No.: PCT/KR2019/014610
§ 371 (c)(1),
(2) Date: Apr. 20, 2021

(87) PCT Pub. No.: WO2020/096275
PCT Pub. Date: May 14, 2020

(65) Prior Publication Data
US 2021/0392668 A1     Dec. 16, 2021

(30) Foreign Application Priority Data

Nov. 8, 2018  (KR) .................. 10-2018-0136488
Aug. 8, 2019  (KR) .................. 10-2019-0096944

(51) Int. Cl.
*H04W 72/1273*     (2023.01)
*H04W 72/0446*     (2023.01)
*H04W 72/54*       (2023.01)

(52) U.S. Cl.
CPC ... *H04W 72/1273* (2013.01); *H04W 72/0446* (2013.01); *H04W 72/54* (2023.01)

(58) Field of Classification Search
CPC ......... H04W 72/1273; H04W 72/0446; H04W 72/54; H04W 74/08; H04L 5/001;
(Continued)

(56) References Cited

U.S. PATENT DOCUMENTS

2016/0021661 A1   1/2016  Yerramalli et al.
2018/0007576 A1   1/2018  Lee et al.
(Continued)

FOREIGN PATENT DOCUMENTS

WO    2016010684 A1    1/2016
WO    2016105132 A1    6/2016
(Continued)

OTHER PUBLICATIONS

Search Report of the European from Appl'n No. 19881731.4, dated Oct. 15, 2021.

*Primary Examiner* — Jae Y Lee
(74) *Attorney, Agent, or Firm* — BRYAN CAVE LEIGHTON PAISNER LLP

(57) ABSTRACT

The present disclosure provides a method for receiving, by a terminal, a channel state information-reference signal (CSI-RS) in an unlicensed band. Particularly, the disclosure comprises: receiving CSI-RS resource information for receiving the CSI-RS and information relating to a first bandwidth allocated for the CSI-RS; and receiving the CSI-RS through CSI-RS resources included in at least one second bandwidth among multiple second bandwidths included in the first bandwidth, wherein the at least second bandwidth is determined on the basis of clear channel assessment (CCA) for each of the multiple second bandwidths.

9 Claims, 28 Drawing Sheets

(58) Field of Classification Search
CPC ... H04L 5/0048; H04L 5/0092; H04L 1/1671; H04L 5/0012; H04L 5/0026; H04L 5/0055; H04B 7/063; H04B 7/0632; H04B 7/0639; H04B 7/0626; H04B 7/0695; H04B 7/088

See application file for complete search history.

(56) References Cited

U.S. PATENT DOCUMENTS

| | | | |
|---|---|---|---|
| 2018/0279297 A1* | 9/2018 | Nogami | H04L 1/1887 |
| 2019/0082448 A1* | 3/2019 | Nogami | H04L 5/0053 |
| 2020/0008216 A1* | 1/2020 | Iyer | H04W 72/23 |
| 2020/0084794 A1* | 3/2020 | Zhang | H04W 72/121 |

FOREIGN PATENT DOCUMENTS

| | | |
|---|---|---|
| WO | 2016129908 A1 | 8/2016 |
| WO | 2017043834 A1 | 3/2017 |
| WO | 2017126935 A1 | 7/2017 |

* cited by examiner (A) CONTROL-PLANE PROTOCOL STACK (B) USER-PLANE PROTOCOL STACK (a)  (b)

(a)

(b)

METHOD FOR TRANSMITTING OR RECEIVING CHANNEL STATE INFORMATION-REFERENCE SIGNAL IN UNLICENSED BAND, AND DEVICE THEREFOR

This application is the National Stage filing under 35 U.S.C. 371 of International Application No. PCT/KR2019/014610, filed on Oct. 31, 2019, which claims priority to Korean Patent Application Nos. 10-2018-0136488, filed on Nov. 8, 2018 and 10-2019-0096944, filed on Aug. 8, 2019, the contents of which are hereby incorporated by reference herein in their entirety.

TECHNICAL FIELD

The present disclosure relates to a method of transmitting and receiving a channel state information reference signal (CSI-RS) in an unlicensed band and device therefor and, more particularly, to a method of transmitting and receiving a CSI-RS by performing clear channel assessment (CCA) on a sub-band basis for an entire band for CSI-RS transmission in an unlicensed band and device therefor.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

The object of the present disclosure is to provide a method of transmitting and receiving a channel state information reference signal (CSI-RS) in an unlicensed band and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of receiving a channel state information reference signal (CSI-RS) by a user equipment (UE) in an unlicensed band is provided. The method may include: receiving information about a CSI-RS resource for receiving the CSI-RS and information about a first bandwidth allocated for the CSI-RS; and receiving the CSI-RS on CSI-RS resources included in at least one second bandwidth among a plurality of second bandwidths included in the first bandwidth, wherein the at least second bandwidth may be determined based on clear channel assessment (CCA) for each of the plurality of second bandwidths.

The at least one second bandwidth may be a second bandwidth for which a CCA result is determined as idle.

The method may further include receiving a group common physical downlink control channel (GC-PDCCH) including information about the at least one second bandwidth.

The CSI-RS may be transmitted within a transmit opportunity (TXOP) or a discovery reference signal (DRS) transmission window.

The CSI-RS may be transmitted in all of the plurality of second bandwidths.

The CSI-RS resource may be configured for each of the plurality of second bandwidths.

The UE may be capable of communicating with at least one of another UE other than the UE, a network, a base station, or an autonomous driving vehicle.

In another aspect of the present disclosure, a UE for receiving a channel state information reference signal in an unlicensed band is provided. The UE may include: at least one transceiver; at least one processor; and at least one memory operably connected to the at least one processor and configured to store instructions that, when executed, cause the at least one processor to perform operations including: receiving information about a CSI-RS resource for receiving the CSI-RS and information about a first bandwidth allocated for the CSI-RS through the at least one transceiver; and receiving the CSI-RS on CSI-RS resources included in at least one second bandwidth among a plurality of second bandwidths included in the first bandwidth through the at least one transceiver, wherein the at least second bandwidth may be determined based on CCA for each of the plurality of second bandwidths.

The at least one second bandwidth may be a second bandwidth for which a CCA result is determined as idle.

The operations may further include receiving a GC-PDCCH including information about the at least one second bandwidth.

The CSI-RS may be transmitted within a TXOP or a DRS transmission window.

The CSI-RS may be transmitted in all of the plurality of second bandwidths.

The CSI-RS resource may be configured for each of the plurality of second bandwidths.

The UE may be capable of communicating with at least one of another UE other than the UE, a network, a base station, or an autonomous driving vehicle.

In a further aspect of the present disclosure, a device for receiving a CSI-RS in an unlicensed band is provided. The device may include: at least one processor; and at least one memory operably connected to the at least one processor and configured to store instructions that, when executed, cause the at least one processor to perform operations including: receiving information about a CSI-RS resource for receiving the CSI-RS and information about a first bandwidth allocated for the CSI-RS; and receiving the CSI-RS on CSI-RS resources included in at least one second bandwidth among a plurality of second bandwidths included in the first bandwidth through the at least one transceiver, wherein the at least second bandwidth may be determined based on CCA for each of the plurality of second bandwidths.

Advantageous Effects

According to the present disclosure, a channel state information reference signal (CSI-RS) may be efficiently transmitted and received even in an unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
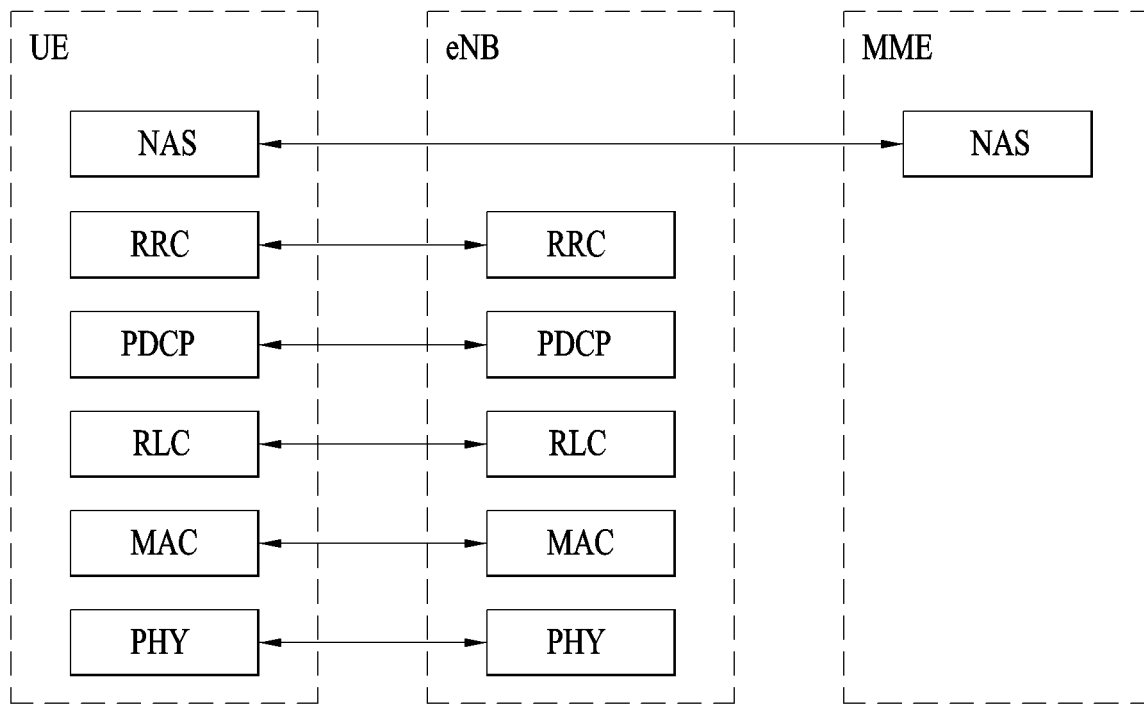
FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
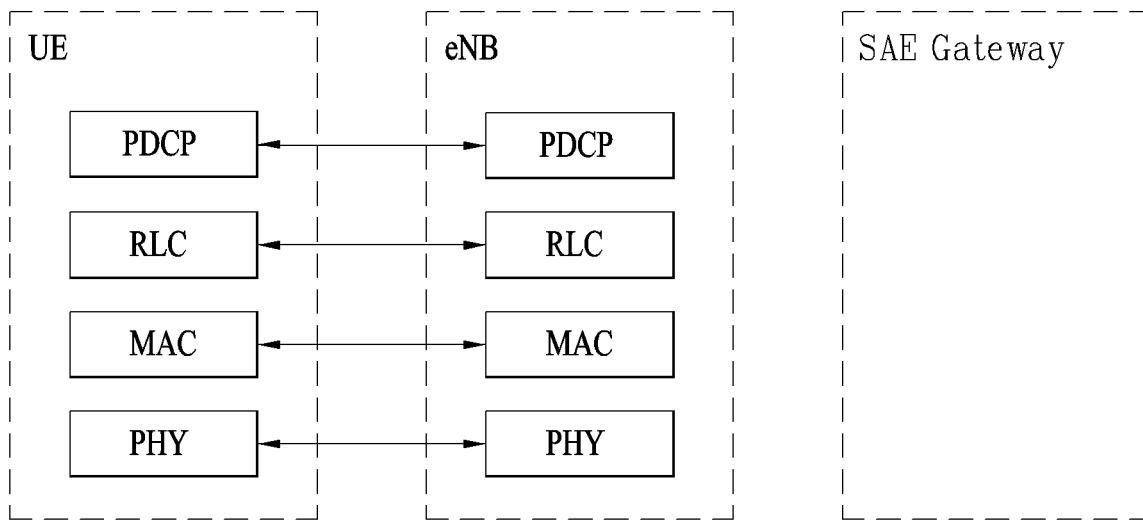

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
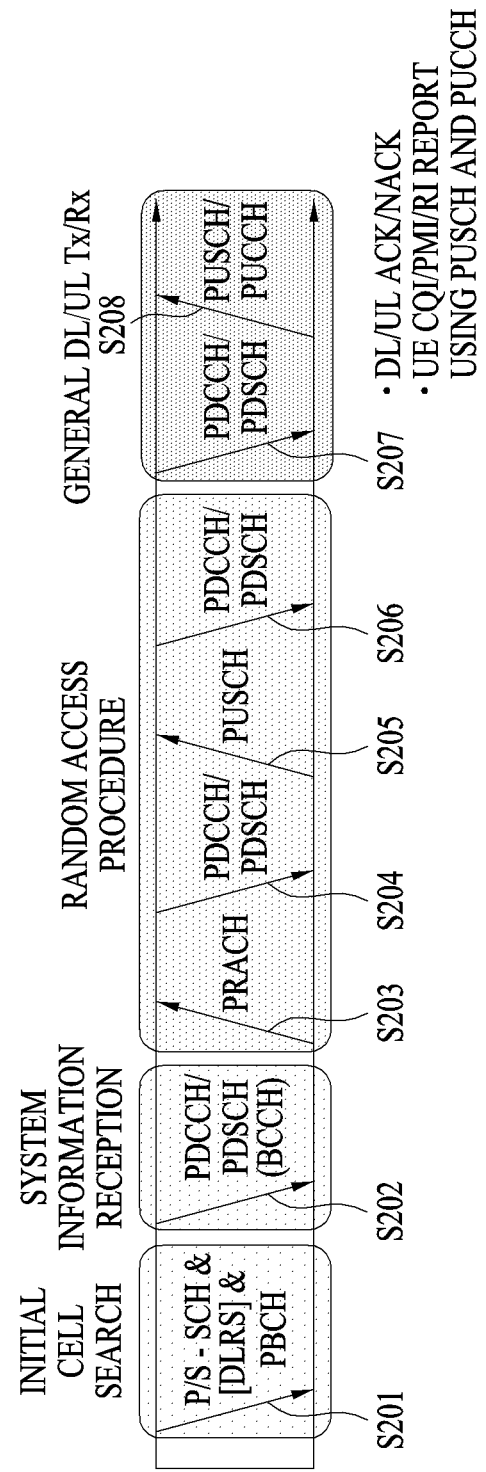
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
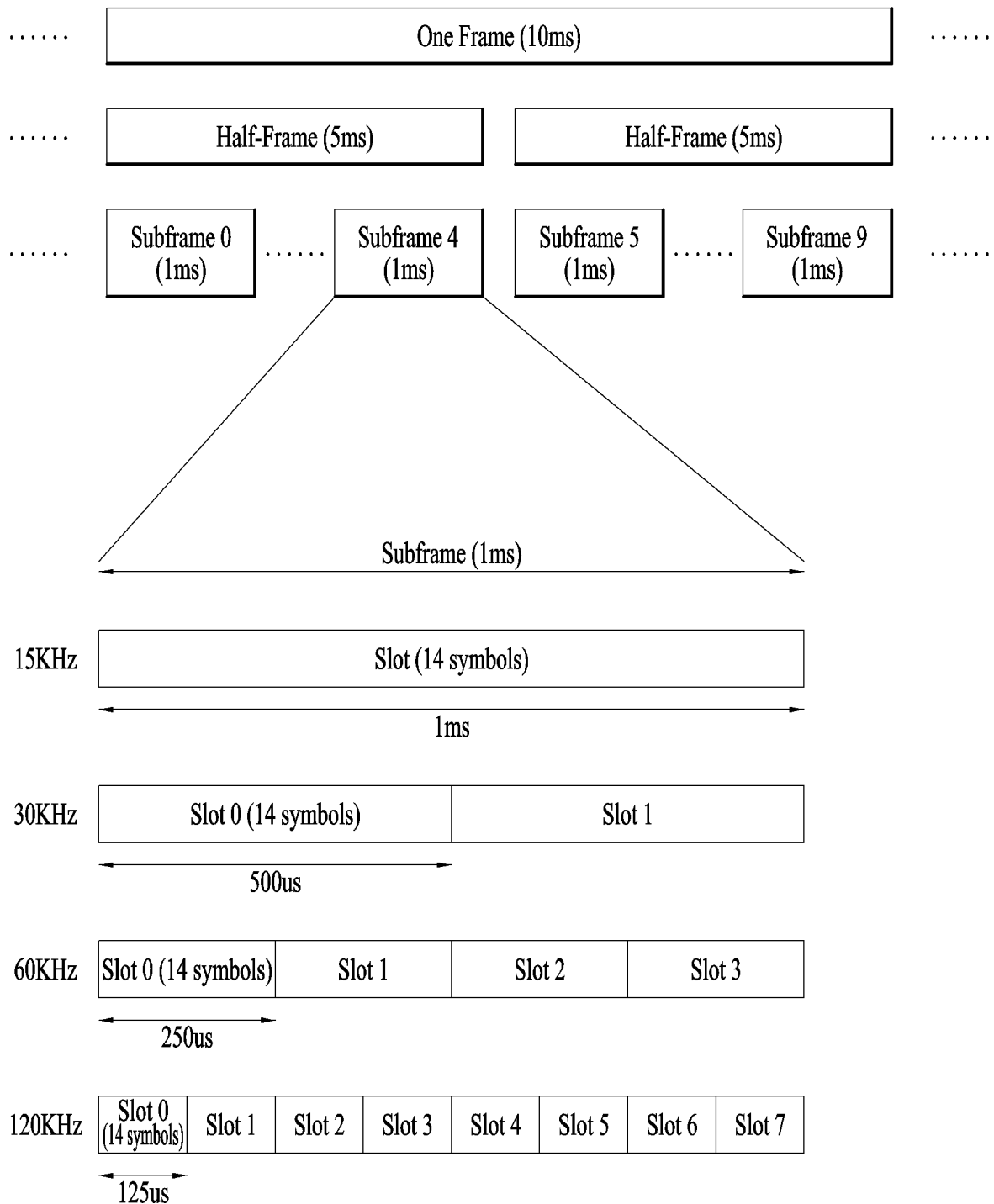
FIGS. 3, 4 and 5 are diagrams illustrating structures of a radio frame and slots used in a new RAT (NR) system.
Figure 4:
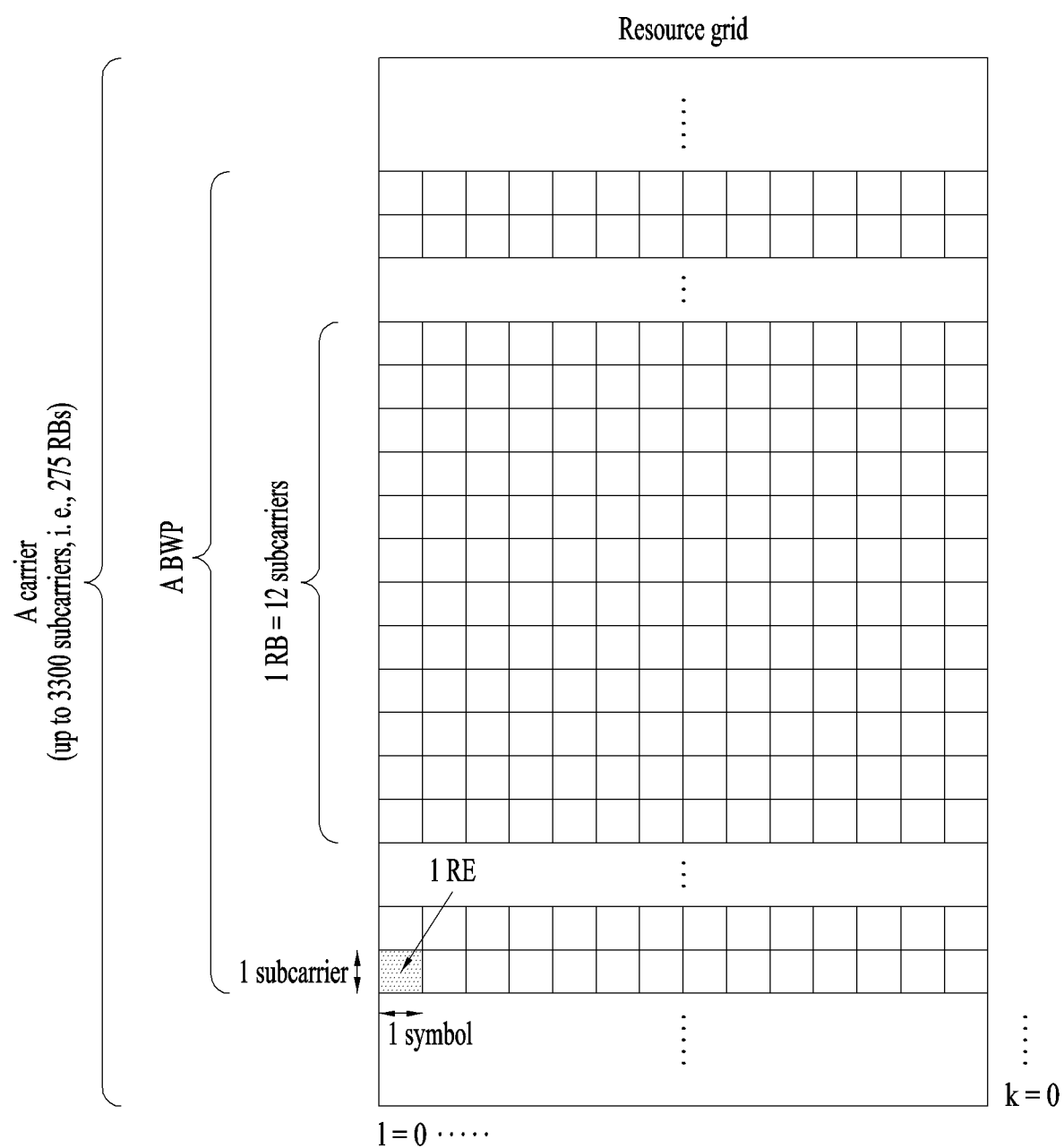

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 5:
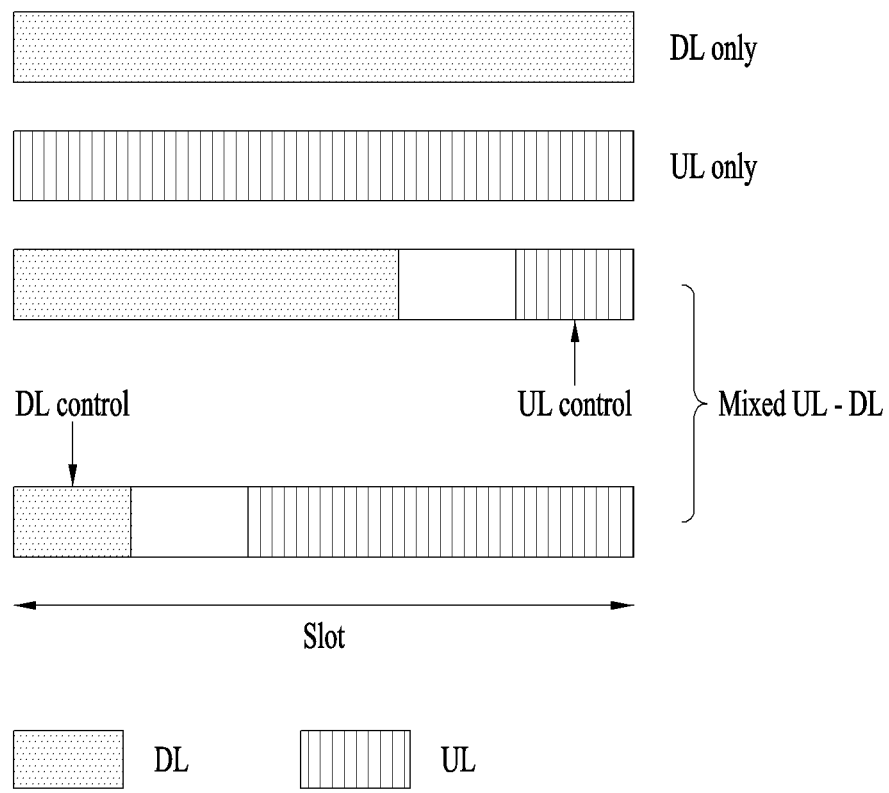

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+DL data region
    UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Figure 6:
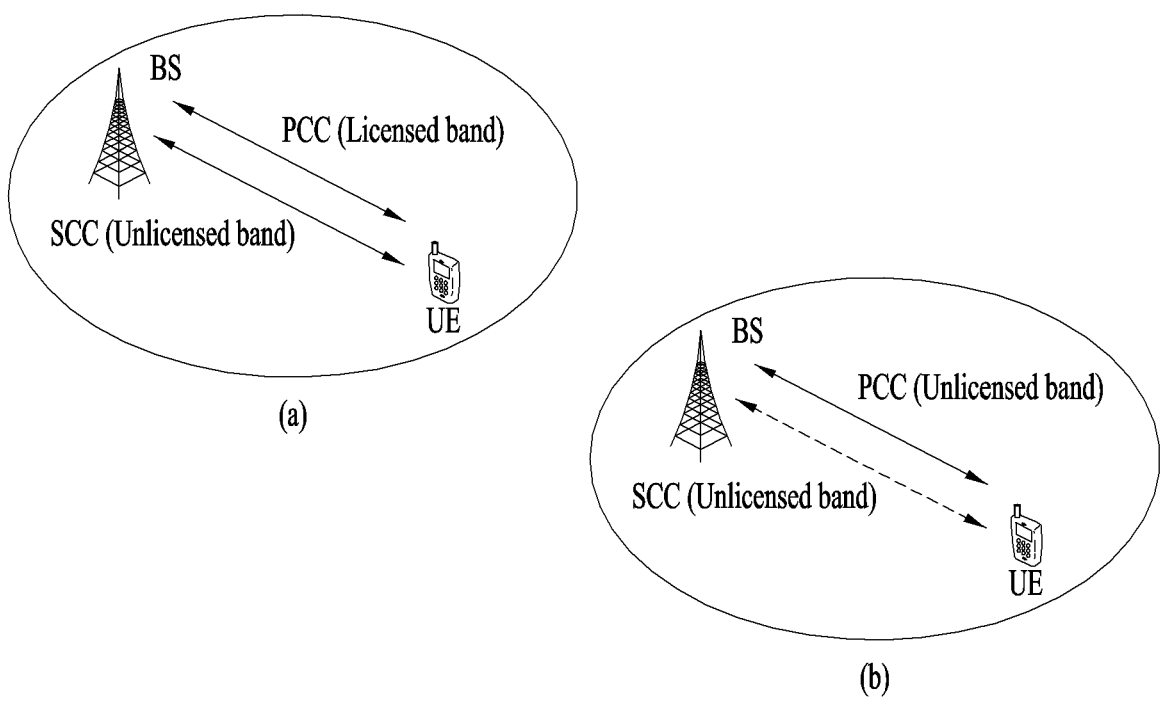
FIGS. 6 to 8 are diagrams illustrating downlink and uplink transmission in an unlicensed band.

FIG. 6 illustrates an exemplary wireless communication system supporting an unlicensed band, which is applicable to the present disclosure.

In the following description, a cell operating in a licensed band (hereinafter, referred to as an L-band) is defined as an L-cell, and the carrier of an L-cell is defined as a (DL/UL) LCC. Further, a cell operating in an unlicensed band (hereinafter, referred to as a U-band) is defined as a U-cell and the carrier of a U-cell is defined as a (DL/UL) UCC. The carrier/carrier-frequency of a cell may refer to the operating frequency (e.g., center frequency) of the cell. A cell/carrier (e.g., component carrier (CC)) is genetically referred to as a cell.

When a UE and a BS transmit and receive signals in a carrier-aggregated LCC and UCC as illustrated in FIG. 6(a), the LCC may be configured as a primary CC (PCC) and the UCC may be configured as a secondary CC (SCC). As illustrated in FIG. 6(b), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

The NR frame structure of FIG. 5 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

To transmit a DL signal in an unlicensed band, the BS may indicate the configuration of OFDM symbols used in subframe #n to the UE by signaling. The term subframe may be replaced with slot or time unit (TU).

Specifically, in an LTE system supporting an unlicensed band, the UE may assume (or identify) the configuration of OFDM symbols occupied in subframe #n by a specific field (e.g., a Subframe configuration for LAA field or the like) in DCI received in subframe #n−1 or subframe #n from the BS.

Table 3 describes a method of indicating the configuration of OFDM symbols used for transmission of a DL physical channel and/or physical signal in a current and/or next subframe by the Subframe configuration for LAA field in the LTE system.

TABLE 3

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
- (—, Y) means UE may assume the first Y symbols are occupied in next subframe and other symbols in the next subframe are not occupied. - (X, —) means UE may assume the first X symbols are occupied in current subframe and other symbols in the current subframe are not occupied. - (X, *) means UE may assume the first X symbols are occupied in current subframe, and at least the first OFDM symbol of the next subframe is not occupied.

For UL signal transmission in an unlicensed band, the BS may indicate a UL transmission period to the UE by signaling.

Specifically in the LTE system supporting an unlicensed band, the UE may obtain 'UL duration' and 'UL offset' information for subframe #n from a 'UL duration and offset' field in detected DCI.

Table 4 illustrates a method of indicating the configuration of a UL offset and a UL duration by the UL duration and offset field in the LTE system.

TABLE 4

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |

TABLE 4-continued

| Value of 'UL duration and offset' field | UL offset, l (in subframes) | UL duration, d (in subframes) |
|---|---|---|
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, if the UL duration and offset field configures (or indicates) UL offset 1 and UL duration d for subframe #n, the UE does not need to receive a DL physical channel and/or physical signal in subframe #(n+1+i) (where i=0, 1, . . . , d−1).

The BS may perform one of the following unlicensed band access procedures (e.g., channel access procedures (CAPs)) to transmit a DL signal in the unlicensed band.

(1) First DL CAP Method

Figure 7:
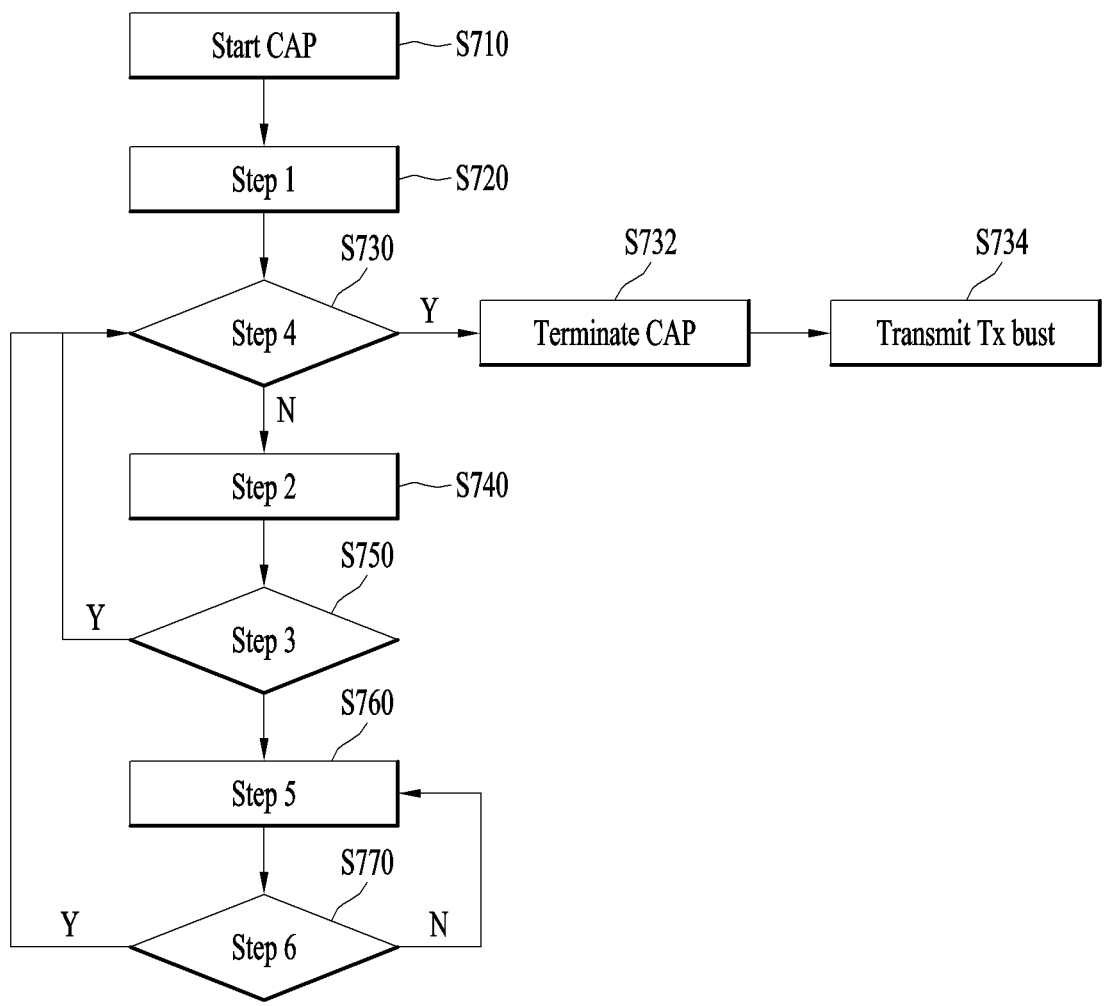

FIG. 7 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S710). The BS may randomly select a backoff counter N within a contention window (CW) according to step 1. N is set to an initial value $N_{init}$ (S720). $N_{init}$ is a random value selected from the values between 0 and $CW_p$. Subsequently, when the backoff counter value N is 0 according to step 4 (S730; Y), the BS terminates the CAP (S732). The BS may then perform a Tx burst transmission including transmission of a PDSCH/PDCCH/EPDCCH (S734). On the contrary, when the backoff counter value N is not 0 (S730; N), the BS decrements the backoff counter value by 1 according to step 2 (S740). Subsequently, the BS checks whether the channel of U-cell(s) is idle (S750). If the channel is idle (S750; Y), the BS determines whether the backoff counter value is 0 (S730). On the contrary, when the channel is not idle, that is, the channel is busy (S750; N), the BS determines whether the channel is idle during a longer defer duration $T_d$ (25 usec or longer) than a slot duration (e.g., 9 usec) according to step 5 (S760). If the channel is idle during the defer duration (S770; Y), the BS may resume the CAP. The defer duration may include a 16-usec duration and the immediately following $m_p$ consecutive slot durations (e.g., each being 9 usec). On the contrary, if the channel is busy during the defer duration (S770; N), the BS re-checks whether the channel of the U-cell(s) is idle during a new defer duration by performing step S760 again.

Table 5 illustrates that $m_p$, a minimum CW, a maximum CW, a maximum channel occupancy time (MCOT), and an allowed CW size applied to a CAP vary according to channel access priority classes.

TABLE 5

| Channel Access Priority Class (p) | $m_p$ | $CW_{min,p}$ | $CW_{max,p}$ | $T_{ulcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}=25$ us. $T_{drs}$ includes a duration $T_f$ (=16 us) following one sensing slot duration Ti (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Further, the UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

(1) Type 1 UL CAP Method

Figure 8:
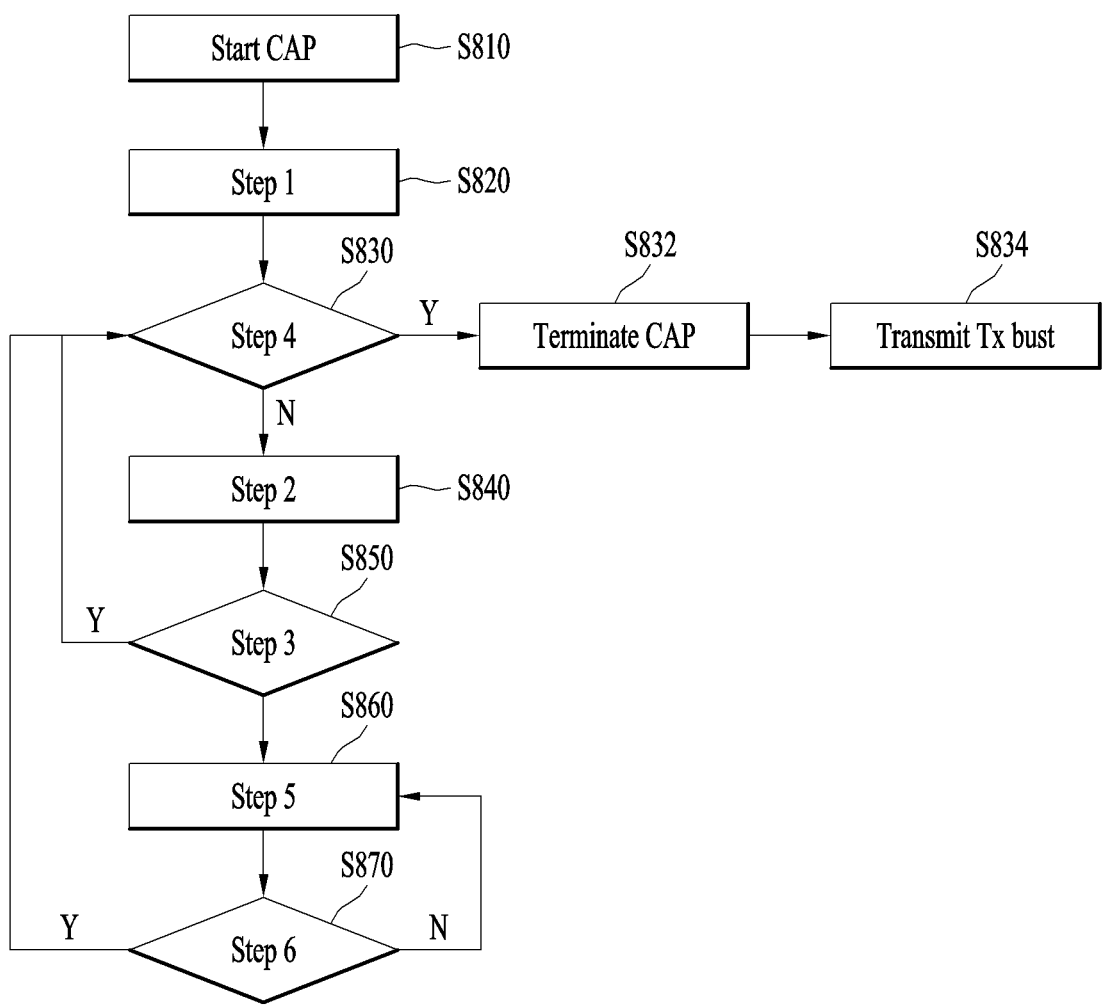

FIG. 8 is a flowchart illustrating UE's Type 1 CAP operation for UL signal transmission.

To transmit a signal in the U-band, the UE may initiate a CAP (S810). The UE may randomly select a backoff counter N within a contention window (CW) according to step 1. In this case, N is set to an initial value $N_{init}$ (S820). $N_{init}$ may have a random value between 0 and $CW_p$. If it is determined according to step 4 that the backoff counter value (N) is 0 (YES in S830), the UE terminates the CAP (S832). Then, the UE may perform Tx burst transmission (S834). If the backoff counter value is non-zero (NO in S830), the UE decreases the backoff counter value by 1 according to step 2 (S840). The UE checks whether the channel of U-cell(s) is idle (S850). If the channel is idle (YES in S850), the UE checks whether the backoff counter value is 0 (S830). On the contrary, if the channel is not idle in S850, that is, if the channel is busy (NO in S850), the UE checks whether the corresponding channel is idle for a defer duration Ta (longer than or equal to 25 usec), which is longer than a slot duration (e.g., 9 usec), according to step 5 (S860). If the channel is idle for the defer duration (YES in S870), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S870), the UE performs step S1260 again to check whether the channel is idle for a new defer duration.

Table 6 shows that the values of $m_p$, a minimum CW, a maximum CW, an MCOT, and allowed CW sizes, which are applied to the CAP, vary depending on channel access priority classes.

TABLE 6

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |

TABLE 6-continued

| Channel Access Priority Class (p) | $m_p$ | $CW_{min, p}$ | $CW_{max, p}$ | $T_{ulmcot, p}$ | allowed $CW_p$ sizes |
|---|---|---|---|---|---|
| 4 | 7 | 15 | 1023 | 6 ms or 10 ms | {15, 31, 63, 127, 255, 511, 1023} |

NOTE1:
For p = 3, 4, $T_{ulmcot, p}$ = 10 ms if the higher layer parameter 'absenceOfAnyOtherTechnology-r14' indicates TRUE, otherwise, $T_{ulmcot, p}$ = 6 ms.
NOTE 2:
When $T_{ulmcot, p}$ = 6 ms it may be increased to 8 ms by inserting one or more gaps. The minimum duration of a gap shall be 100 μs. The maximum duration before including any such gap shall be 6 ms.

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min, p}$ for every priority class p∈{1,2,3,4}. Otherwise, the UE may increase $CW_p$ for every priority class p∈{1,2,3,4} to a next higher allowed value.

A reference subframe (or reference slot) $n_{ref}$ may be determined as follows.

When the UE receives a UL grant in a subframe (or slot) $n_g$ and performs transmission including a UL-SCH, which has no gaps and starts from a subframe (or slot) no, in subframes (or slots) $n_0, n_1, \ldots n_w$ (here, the subframe (or slot) $n_w$ is the most recent subframe (or slot) before a subframe $n_g$-3 in which the UE has transmitted the UL-SCH based on the Type 1 CAP), the reference subframe (or slot) $n_{ref}$ may be the subframe no.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 9:
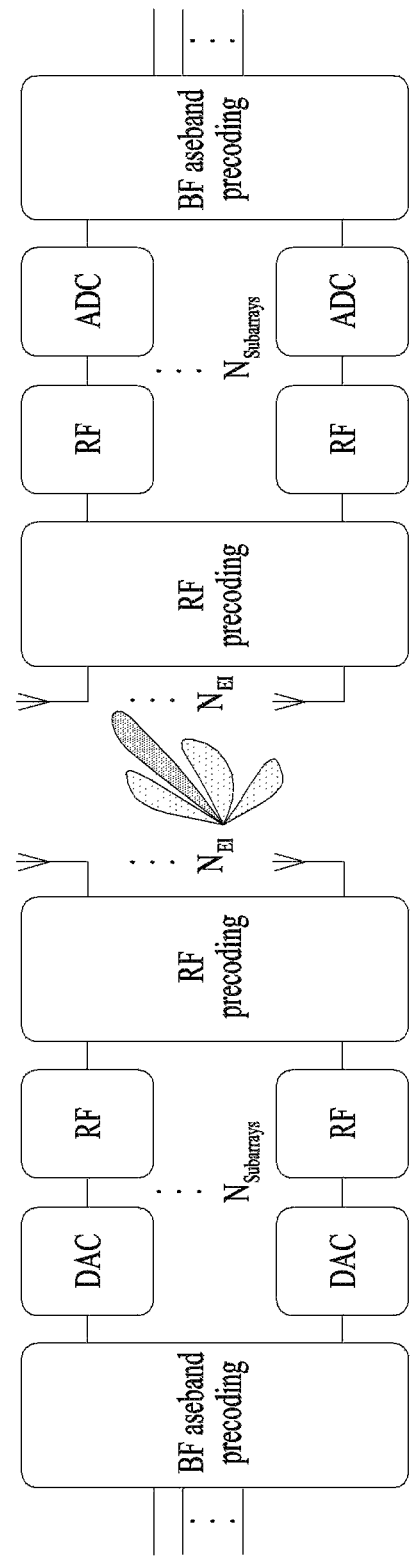
FIG. 9 is a diagram illustrating analog beamforming in the NR system.

FIG. 9 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Downlink Beam Management (DL BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using Tx beams and/or Rx beams in a predetermined manner during a predetermined time interval.

Beam report: the UE reports information about a beamformed signal based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 10:
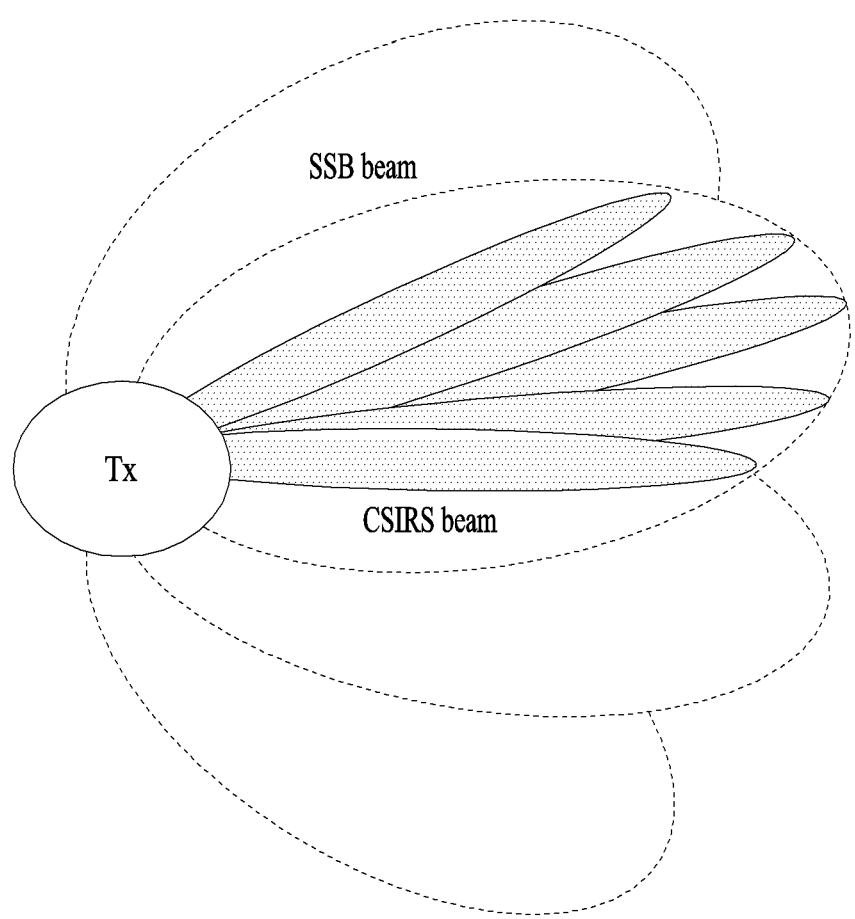
FIGS. 10, 11, 12, 13, and 14 are diagrams illustrating beam management in the NR system.

FIG. 10 is a diagram illustrating exemplary BF using an SSB and a CSI-RS.

Referring to FIG. 10, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts.

1. DL BM Using SSB

Figure 11:
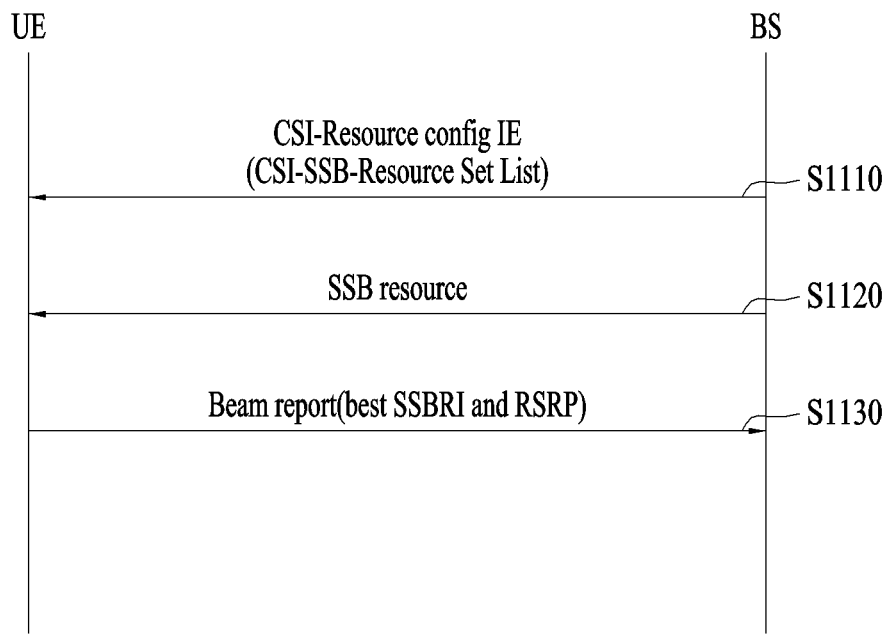

FIG. 11 is a diagram illustrating a signal flow for an exemplary DL BM process using an SSB.

An SSB-based beam report is configured during CSI/beam configuration in RRC_CONNECTED mode.

- A UE receives a CSI-ResourceConfig information element (IE) including CSI-SSB-ResourceSetList for SSB resources used for BM from a BS (S1110). The RRC parameter, CSI-SSB-ResourceSetList is a list of SSB resources used for BM and reporting in one resource set. The SSB resource set may be configured as {SSBx1, SSBx2, SSBx3, SSBx4}. SSB indexes may range from 0 to 63.
- The UE receives signals in the SSB resources from the BS based on CSI-SSB-ResourceSetList (S1120).
- When CSI-RS reportConfig related to an SSBRI and RSRP reporting has been configured, the UE reports a best SSBRI and an RSRP corresponding to the best SSBRI to the BS (S1130). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

2. DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used for a tracking reference signal (TRS); and iii) when either of Repetition or TRS_info is configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

Figure 12:
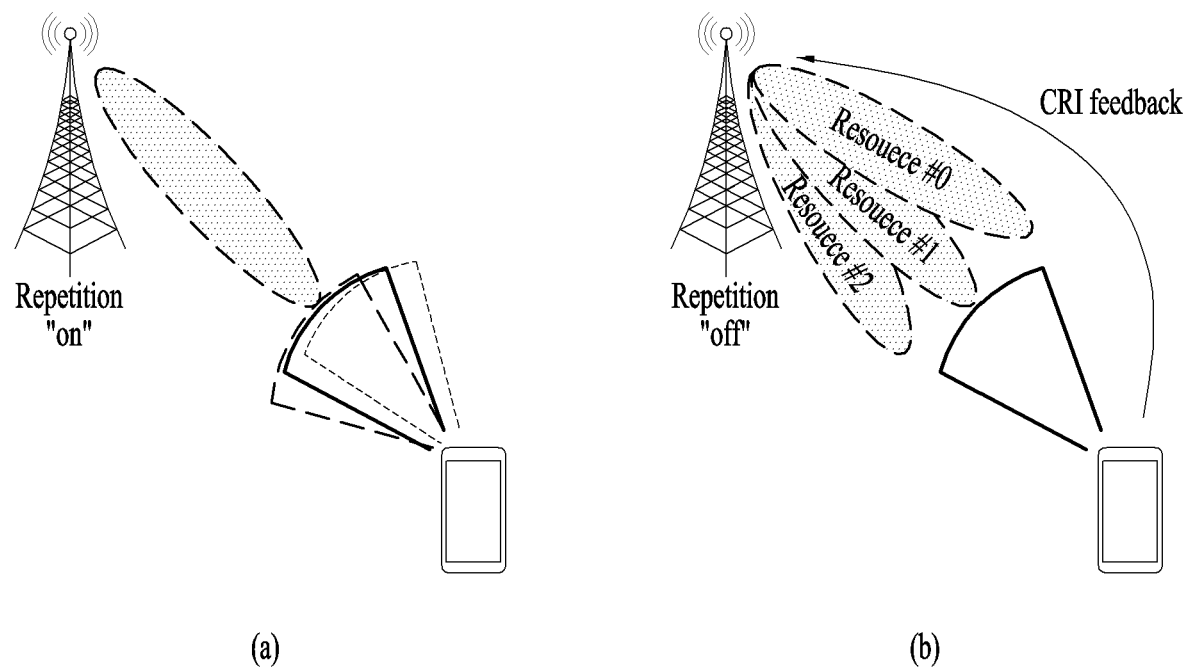

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 12 illustrates another exemplary DL BM process using a CSI-RS.

FIG. 12(a) illustrates an Rx beam refinement process of a UE, and FIG. 12(b) illustrates a Tx beam sweeping process of a BS. Further, FIG. 12(a) is for a case in which Repetition is set to 'ON', and FIG. 12(b) is for a case in which Repetition is set to 'OFF'.

Figure 13:
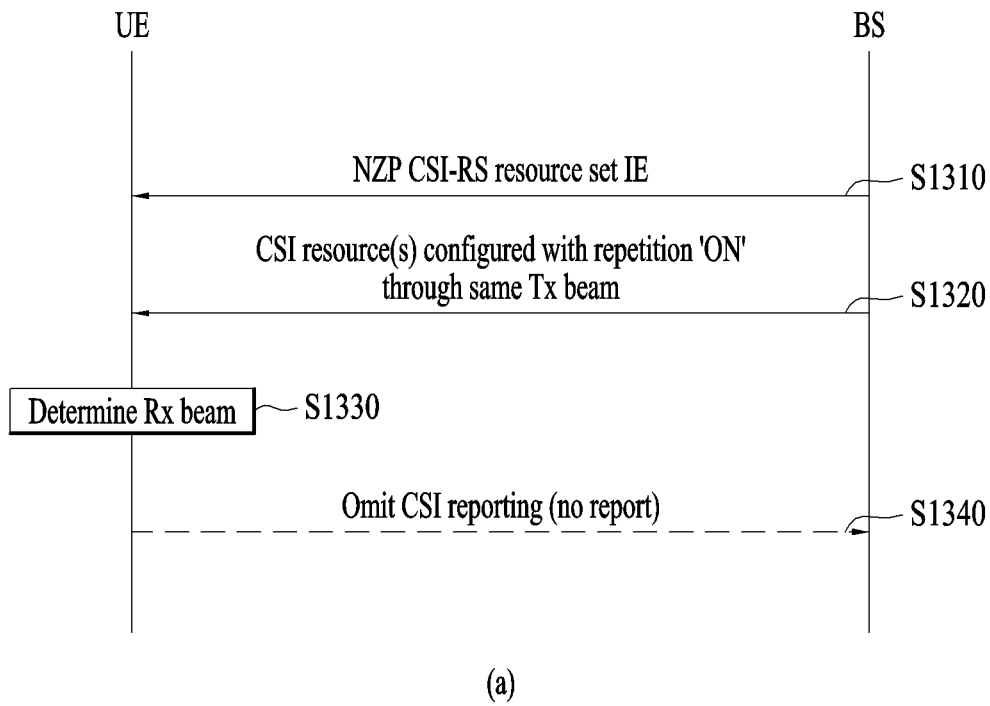
Figure 13:
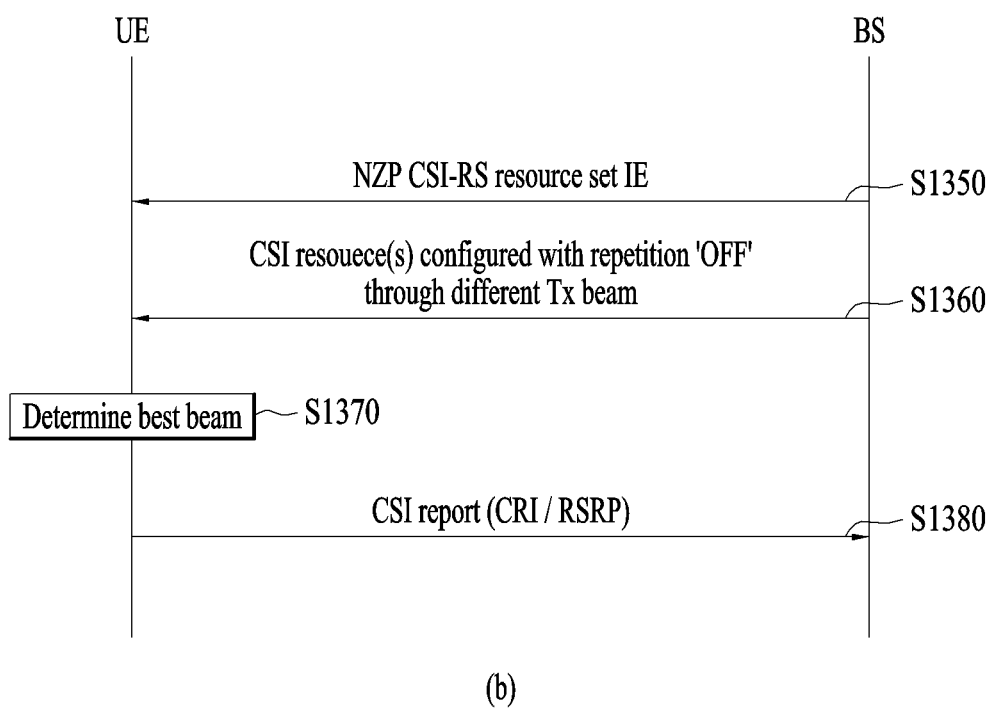

With reference to FIGS. 12(a) and 13(a), an Rx beam determination process of a UE will be described below.

FIG. 13(a) is a diagram illustrating a signal flow for an exemplary Rx beam determination process of a UE.

- The UE receives an NZP CSI-RS resource set IE including an RRC parameter 'Repetition' from a BS by RRC signaling (S1210). The RRC parameter 'Repetition' is set to 'ON' herein.
- The UE repeatedly receives signals in resource(s) of a CSI-RS resource set for which the RRC parameter 'Repetition' is set to 'ON' on the same Tx beam (or DL spatial domain Tx filter) of the BS in different OFDM symbols (S1220).
- The UE determines its Rx beam (S1230).
- The UE skips CSI reporting (S1240). That is, the UE may skip CSI reporting, when the RRC parameter 'Repetition' is set to 'ON'.

With reference to FIGS. 12(b) and 13(b), a Tx beam determination process of a BS will be described below.

FIG. 13(b) is a diagram illustrating an exemplary Tx beam determination process of a BS.

- A UE receives an NZP CSI-RS resource set IE including an RRC parameter 'Repetition' from the BS by RRC signaling (S1350). When the RRC parameter 'Repetition' is set to 'OFF', this is related to a Tx beam sweeping process of the BS.
- The UE receives signals in resource(s) of a CSI-RS resource set for which the RRC parameter 'Repetition' is set to 'OFF' on different Tx beams (or DL spatial domain Tx filters) of the BS (S1360).
- The UE selects (or determines) a best beam (S1370).
- The UE reports the ID (e.g., CRI) of the selected beam and related quality information (e.g., an RSRP) to the BS (S1380). That is, the UE reports a CRI and an RSRP corresponding to the CRI, when a CSI-RS is transmitted for BM.

Figure 14:
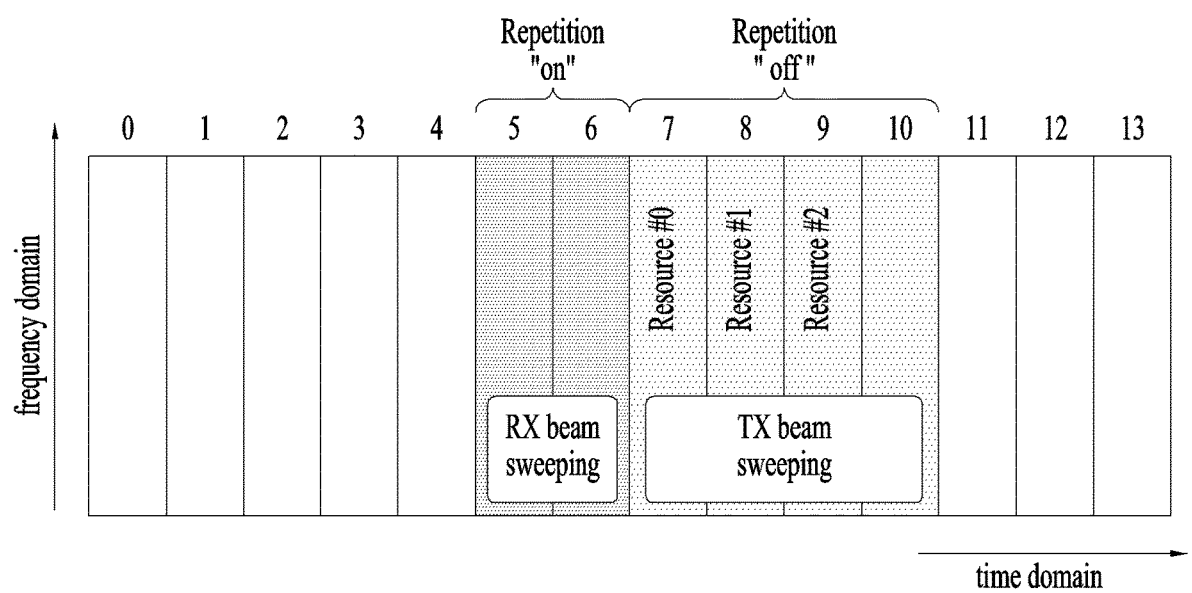

FIG. 14 is a diagram illustrating exemplary resource allocation in the time and frequency domains, which is related to the operation of FIG. 12.

When Repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 7 describes an example of a TCI-State IE. The TC-State IE is related to a QCL type corresponding to one or two DL RSs.

TABLE 7

```
-- ASN1START
-- TAG-TCI-STATE-START
TCI-State ::=            SEQUENCE {
    tci-StateId              TCI-StateId,
    qcl-Type1                QCL-Info,
    qcl-Type2                QCL-Info          OPTIONAL, -- Need R
    ...
}
QCL-Info ::=             SEQUENCE {
    cell                     ServCellIndex         OPTIONAL, -- Need R
    bwp-Id                   BWP-Id                OPTIONAL, -- Cond CSI-RS-Indicated
    referenceSignal          CHOICE {
        csi-rs                   NZP-CSI-RS-ResourceId,
        ssb                      SSB-Index
    },
    qcl-Type                 ENUMERATED {typeA, typeB, typeC, typeD},
    ...
}
-- TAG-TCI-STATE-STOP
-- ASN1STOP
```

In Table 7, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (QCL)

The UE may receive a list of up to M TCI-State configurations to decode a PDSCH according to a detected PDCCH carrying DCI intended for a given cell. M depends on a UE capability.

As described in Table 7, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

CSI-Related Operations

In the NR system, a CSI-RS is used for time/frequency tracking, CSI computation, reference signal received power (RSRP) calculation, and mobility. CSI computation is related to CSI acquisition, and RSRP computation is related to beam management (BM).

Figure 15:
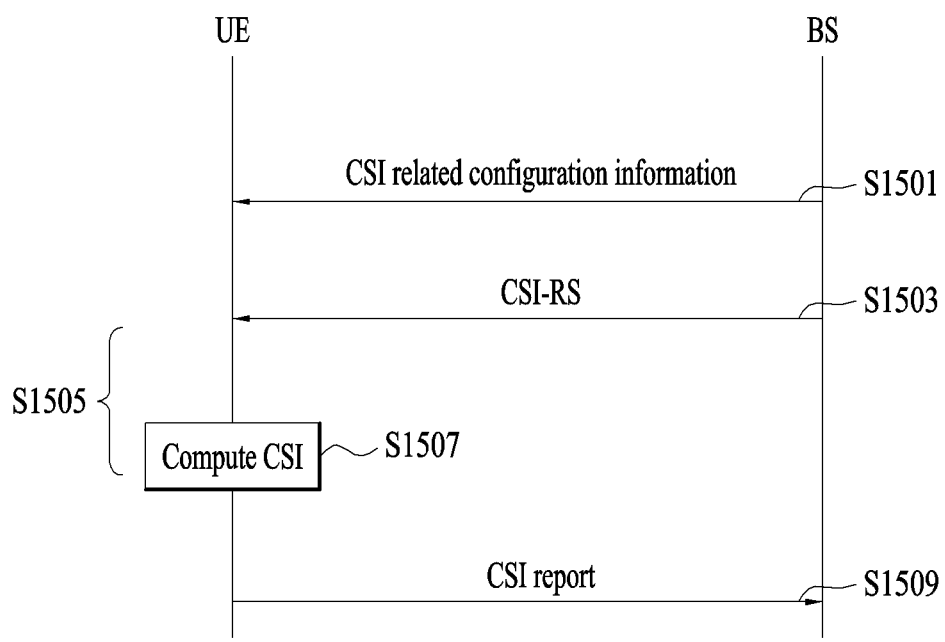
FIG. 15 is a diagram illustrating a signal flow for channel state information (CSI) reporting.

FIG. 15 is a diagram illustrating a signal flow for a CSI-related process.

For one of the above-described uses of the CSI-RS, a UE receives CSI-related configuration information from a BS by RRC signaling (S1501).

The CSI-related configuration information may include at least one of channel state information interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-SSB resource set. That is, the CSI resource configuration-related information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating the use of a CSI-RS (e.g., a BM-related parameter 'repetition' and a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S1505). The CSI measurement may include (1) CSI-RS reception of the UE (S1503) and (2) CSI computation in the received CSI-RS (S1507). Mapping of the CSI-RS to REs of CSI-RS resources in the time and frequency domains is configured by an RRC parameter, CSI-RS-ResourceMapping.

The UE reports the measured CSI to the BS (S1509).

1. CSI Measurement

The NR system supports more flexible and more dynamic CSI measurement and reporting. The CSI measurement may include reception of a CSI-RS and measurement of the received CSI-RS to acquire CSI.

As the time-domain behavior of CSI measurement and reporting, channel measurement (CM) and interference measurement (IM) are supported.

A CSI-IM-based IM resource (IMR) is designed in NR, similarly to a CSI-IM in LTE and configured independently of a zero power (ZP) CSI-RS resource for PDSCH rate matching.

The BS transmits an NZP CSI-RS to the UE on each port of a configured NZP CSI-RS-based IMR.

When there is no PMI and RI feedback for a channel, multiple resources are configured in a set, and the BS or network indicates a subset of NZP CSI-RS resources for channel measurement and/or interference measurement by DCI.

A resource setting and a resource setting configuration will be described in greater detail.

1.1. Resource Setting

Each CSI resource setting 'CSI-ResourceConfig' includes a configuration of S≥1 CSI resource sets (given by an RRC parameter csi-RS-ResourceSetList). S represents the number of configured CSI-RS resource sets. The configuration of S≥1 CSI resource sets includes each CSI resource set including (NZP CSI-RS or CSI-IM) CSI-RS resources, and SSB resources used for RSRP computation.

Each CSI resource setting is located in a DL BWP identified by an RRC parameter bwp-id. All CSI resource settings linked to a CSI reporting setting have the same DL BWP.

The time-domain behavior of a CSI-RS resource within the CSI-ResourceConfig 1E is indicated by an RRC parameter resourceType in the CSI resource setting, and may be set to aperiodic, periodic, or semi-persistent.

One or more CSI resource settings for channel measurement and interference measurement are configured by RRC signaling. A channel measurement resource (CMR) may be an NZP CSI-RS for CSI acquisition, and an IMR may be an NZP CSI-RS for CSI-IM and IM. The CSI-IM (or ZP CSI-RS for IM) is mainly used for inter-cell measurement. The NZP CSI-RS for IM is used mainly for measurement of intra-cell interference from multiple users.

The UE may assume that CSI-RS resource(s) for channel measurement and CSI-IM/NZP CSI-RS resource(s) for interference measurement configured for one CSI report are resource-wise quasi co-located (QCLed) with respect to 'QCL-TypeD'.

1.2. Resource Setting Configuration

A resource setting may mean a resource set list, and one reporting setting may be linked to up to three resource settings.

When one resource setting is configured, the resource setting (given by an RRC parameter resourcesForChannelMeasurement) is for channel measurement for RSRP computation.

When two resource settings are configured, the first resource setting (given by the RRC parameter resourcesForChannelMeasurement) is for channel measurement and the second resource setting (given by csi-IM-ResourcesForInterference or nzp-CSI-RS-ResourcesForInterference) is for interference measurement on the CSI-IM or on the NZP CSI-RS.

When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS-based interference measurement.

When one resource setting (given by resourcesForChannelMeasurement) is configured, the resource setting is for channel measurement for RSRP computation.

When two resource settings are configured, the first resource setting (given by resourcesForChannelMeasurement) is for channel measurement and the second resource setting (given by the RRC parameter csi-IM-ResourcesForInterference) is used for interference measurement performed on the CSI-IM.

1.3. CSI Computation

If interference measurement is performed on the CSI-IM, each CSI-RS resource for channel measurement is resource-wise associated with a CSI-IM resource by the ordering of the CSI-RS resources and CSI-IM resources in a corresponding resource set. The number of CSI-RS resources for channel measurement equals to the number of CSI-IM resources.

For CSI measurement, the UE assumes the following.

Each NZP CSI-RS port configured for interference measurement corresponds to an interference transmission layer.

All interference transmission layers on NZP CSI-RS ports for interference measurement take into account energy per resource element (EPRE) ratios.

The UE assumes another interference signal on RE(s) of NZP CSI-RS resources for channel measurement, NZP CSI-RS resources for interference measurement, or CSI-IM resources for interference measurement.

2. CSI Reporting

Time and frequency resources available for the UE to report CSI are controlled by the BS.

For a CQI, a PMI, a CSI-RS resource indicator (CRI), an SSB resource indicator (SSBRI), a layer indicator (LI), an RI, and an RSRP, the UE receives RRC signaling including N≥1 CSI-ReportConfig reporting settings, M≥1 CSI-ResourceConfig resource settings, and one or two lists of trigger states (given by aperiodicTriggerStateList and semiPersistentOnPUSCH-TriggerStateList). Each trigger state in aperiodicTriggerStateList includes a list of associated CSI-ReportConfigs indicating resource set IDs for a channel and optionally for interference. Each trigger state in semiPersistentOnPUSCH-TriggerStateList contains one associated CSI-ReportConfig That is, the UE transmits a CSI report indicated by CSI-ReportConfigs associated with a corresponding CSI-RS resource setting to the BS. For example, the UE may report at least one of a CQI, a PMI, a CRI, an SSBRI, an LI, an RI, or an RSRP as indicated by CSI-ReportConfigs associated with the CSI resource setting. However, if CSI-ReportConfigs associated with the CSI resource setting indicates 'none', the UE may not report CSI or an RSRP associated with the CSI resource setting. The CSI resource setting may indicate resources for an SS/PBCH block.

DL Channel Structures

An eNB transmits related signals on later-described DL channels to a UE, and the UE receives the related signals on the DL channels from the eNB.

(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers.

An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 16:
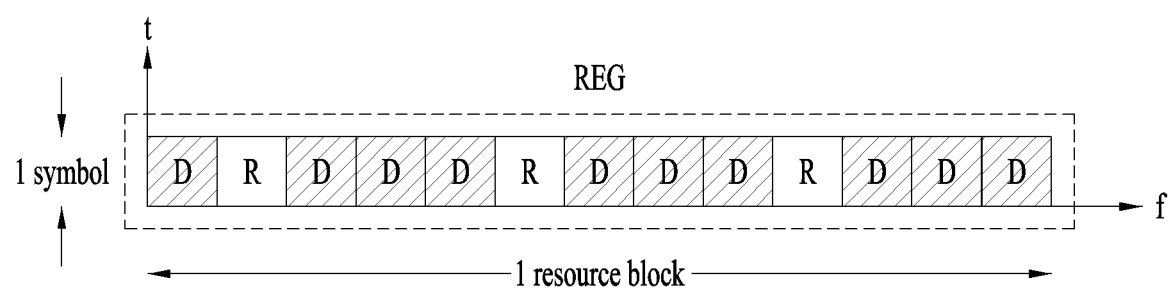
FIGS. 16, 17, and 18 are diagrams illustrating a physical downlink control channel (PDCCH) in the NR system.

FIG. 16 illustrates an exemplary structure of one REG. In FIG. 16, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner That is, the REGs are sequentially numbered in an ascending order, starting from 0 for the first OFDM symbol of the lowest-numbered RB in the CORESET.

Figure 17:
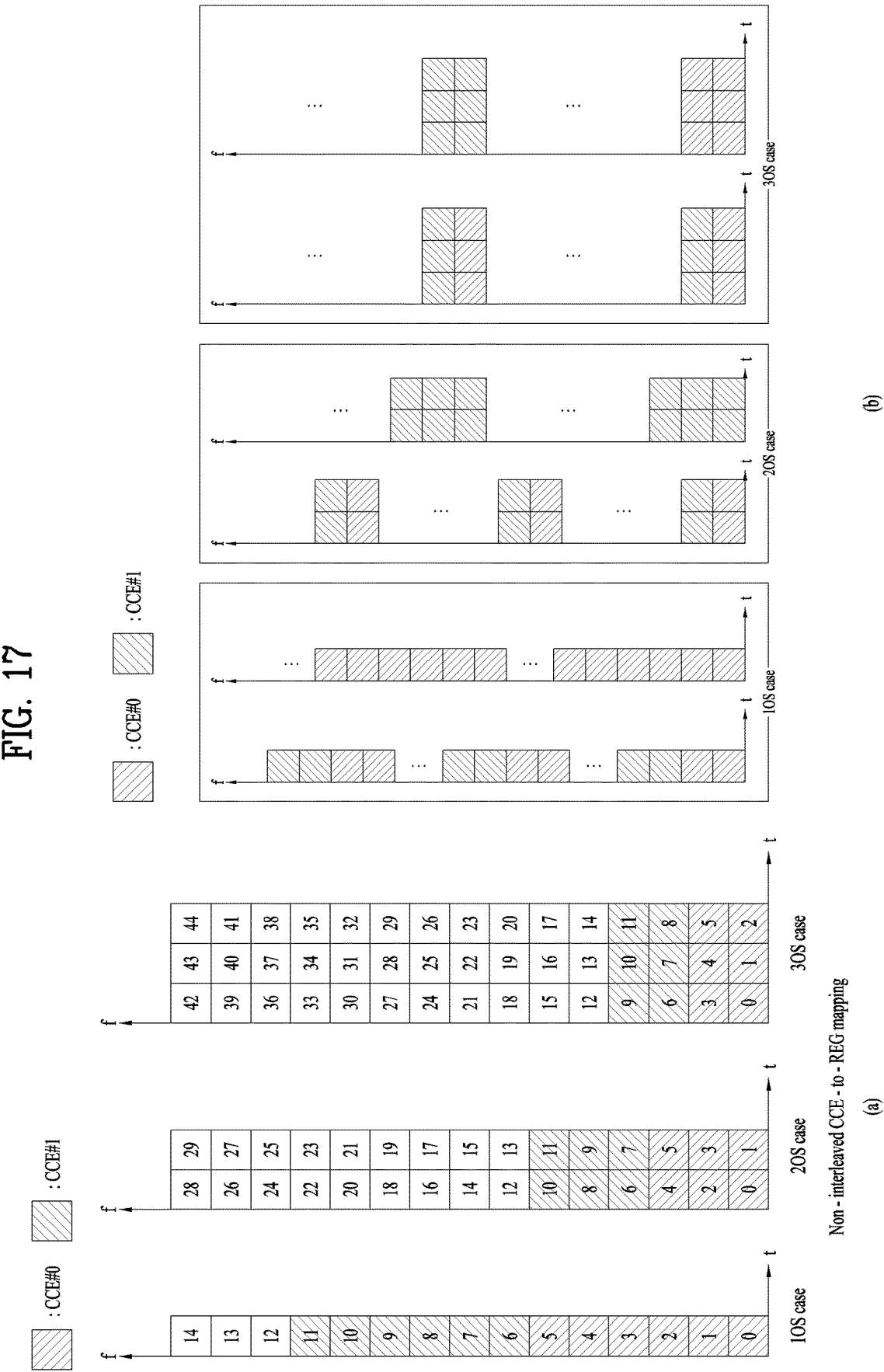

CCE-to-REG mapping for the CORESET may be an interleaved type or a non-interleaved type. FIG. 17(*a*) is an exemplary view illustrating non-interleaved CCE-REG mapping, and FIG. 17(*b*) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 18:
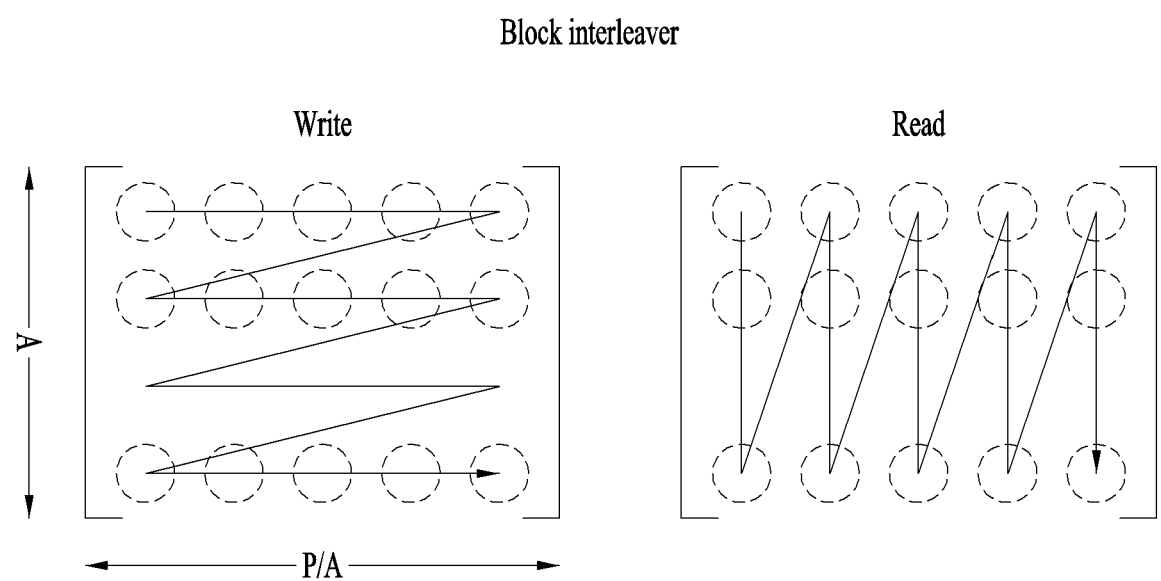

FIG. 18 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 18. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

[Table 8] lists exemplary features of the respective search space types.

TABLE 8

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

[Table 9] lists exemplary DCI formats transmitted on the PDCCH.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

UL Channel Structure

A UE transmits signals over the following UL channels to a BS. In other words, the BS receives the signals from the UE over the following UL channels.

(1) Physical Uplink Shared Channel (PUSCH)

The PUSCH carries UL data (e.g., UL-shared channel transport block (UL-SCH TB)) and/or UCI. The PUSCH is transmitted based on a cyclic prefix orthogonal frequency division multiplexing (CP-OFDM) waveform or a discrete Fourier transform spread orthogonal frequency division multiplexing (DFT-s-OFDM) waveform. When the PUSCH is transmitted in the DFT-s-OFDM waveform, the UE transmits the PUSCH by applying transform precoding. For example, when transform precoding is disabled, the UE may transmit the PUSCH in the CP-OFDM waveform. When transform precoding is enabled, the UE may transmit the PUSCH in the CP-OFDM or DFT-s-OFDM waveform. The PUSCH transmission may be dynamically scheduled by a UL grant in DCI. Alternatively, the PUSCH transmission may be semi-statically scheduled by higher layer signaling (e.g., RRC signaling) (and/or Layer 1 (L1) signaling (e.g., PDCCH)) (configured grant). Both codebook based PUSCH transmission and non-codebook based PUSCH transmission may be allowed.

(2) Physical Uplink Control Channel (PUCCH)

The PUCCH carries UCI, a HARQ-ACK, and/or an SR. Depending on the transmission duration of the PUCCH, the PUCCH is classified into a short PUCCH and a long PUCCH. Table 10 shows PUCCH formats.

TABLE 10

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4 14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

In NR, the CSI-RS may be used for multiple purposes. For example, the CSI-RS may be used as/for a beam management (BM) reference signal (BM-RS), a beam failure detection (BFD) reference signal (BFD-RS), a tracking reference signal (TRS), a radio resource management (RRM) measurement reference signal (RRM-RS), a radio link monitoring (RLM) reference signal (RLM-RS), CSI acquisition, and so on.

Accordingly, the CSI-RS has been designed such that the CSI-RS is capable of being configured flexibly. In addition, since a bandwidth part (BWP), which is configured for each system bandwidth and each UE, covers not only a narrowband of about 5 MHz but also a wideband of 100 MHz or above, a wideband CSI-RS may be configured according to operating environments. In particular, considering that the CSI-RS is defined as a signal for measuring channel quality, channel characteristics may be obtained over the entire frequency band if the CSI-RS is transmitted in all frequency bands occupied by the UE.

However, when one service provider manages an NR system operating in an unlicensed band (NR-U system), the NR-U system managed by the service provider may simultaneously operate in the same band as other systems such as Wi-Fi, or Licensed Assisted Access (LAA) systems or other NR-U systems managed by other service providers, unlike licensed-band systems. For coexistence between systems operating in an unlicensed band, such a system performs channel clearance assessment (CCA) operation to determine whether a channel for signal transmission is occupied by other systems before performing the signal transmission.

That is, a signal is transmitted only when it is determined by the CCA that a frequency band to be used for the signal transmission is idle. Regarding the CCA for the wideband CSI-RS, it may be considered that the RLM-RS is used to determine whether a channel is busy or idle for the entire system bandwidth used by the UE.

Figure 22:
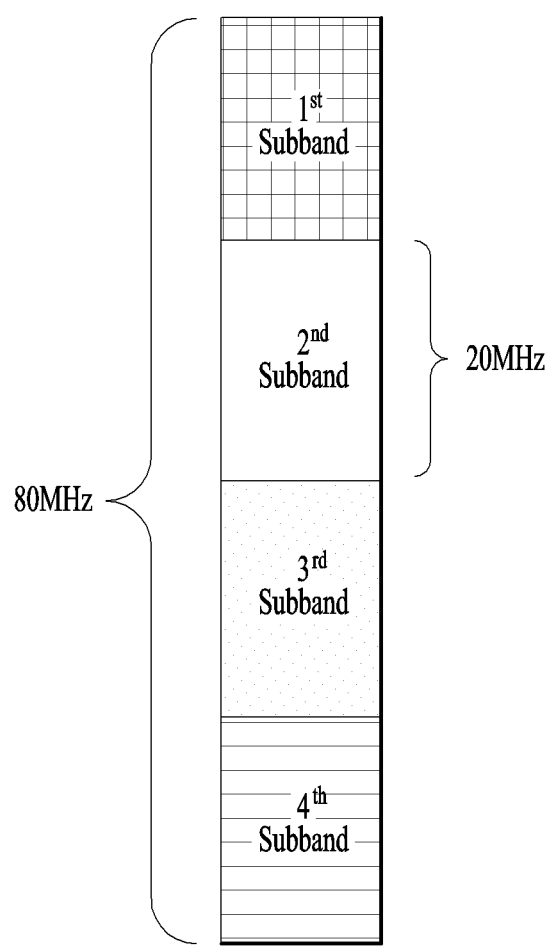
FIG. 22 is a diagram illustrating an implementation example of channel state information reference signal (CSI-RS) transmission in an unlicensed band according to the present disclosure.

However, a frequency band used for the NR-U system is generally expected to be greater than a basic frequency band used for the legacy system such as Wi-Fi. For example, if the NR system operates in an unlicensed band of which the bandwidth is 80 MHz and a system such as Wi-Fi or LAA operates in a bandwidth of 20 MHz as shown in FIG. 22, the probability that a channel is determined to be busy by CCA operation performed for 80 MHz may increase significantly. In particular, when a signal is periodically transmitted, if the probability that a channel is determined to be busy increases, signal transmission failure is highly likely to occur during a time allocated for the transmission.

When the bandwidth of a channel or signal to be transmitted is greater than that of an LBT sub-band (e.g., a sub-band with a bandwidth of 20 MHz), transmitting the corresponding channel only in an LBT sub-band where the channel is determined to be idle may be discussed for data channels.

In the case of the CSI-RS, i.e., a signal for channel quality measurement, if the CSI-RS is transmitted in a partial band, there may be a problem that channel information is not valid for the entire frequency band. For example, when the CSI-RS is transmitted in a second sub-band shown in FIG. 22, the channel quality estimated based on the CSI-RS may not be valid for the entire 80 MHz band.

When the CSI-RS is used as the BM-RS, BFD-RS, RRM-RS, or RLM-RS, it may be considered that one or more sub-bands validly represent the entire frequency band. However, in the case of CSI, the data rate of a data channel transmitted over the entire frequency band may not be configured based on information about a part of the entire frequency band. When the channel quality for the entire frequency band is reported without determining whether the CSI-RS is transmitted, the channel quality may be erroneous so that user throughput may be significantly degraded.

Figure 19:
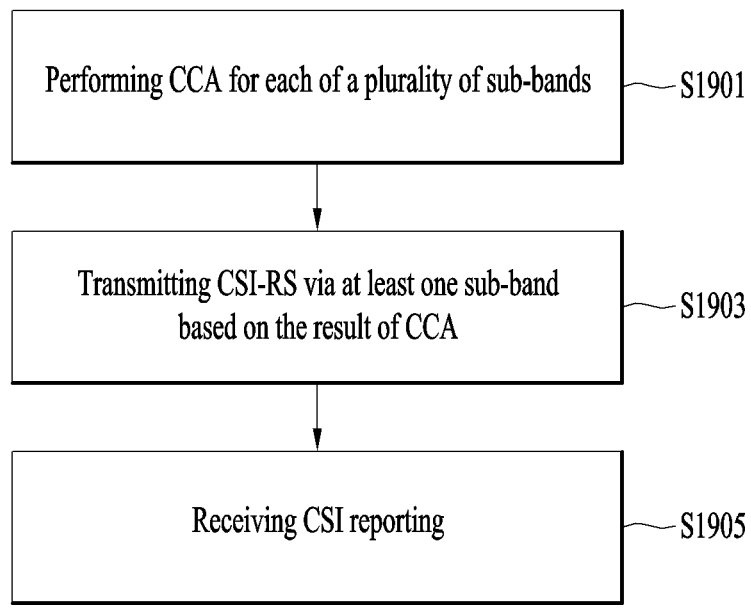
FIGS. 19 to 21 are diagrams illustrating implementation examples of operations of a UE, a base station, and a network according to embodiments of the present disclosure.
Figure 20:
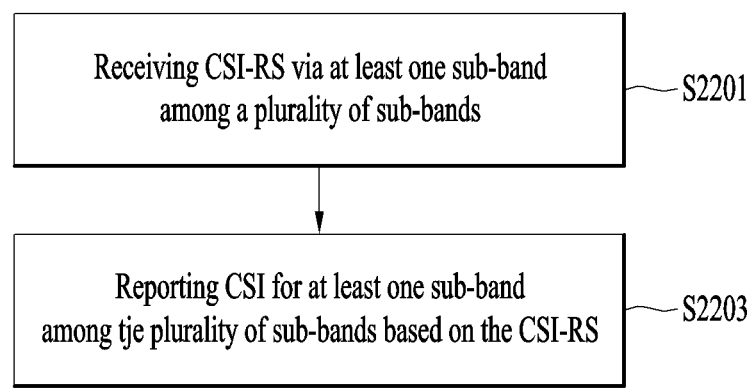
Figure 21:
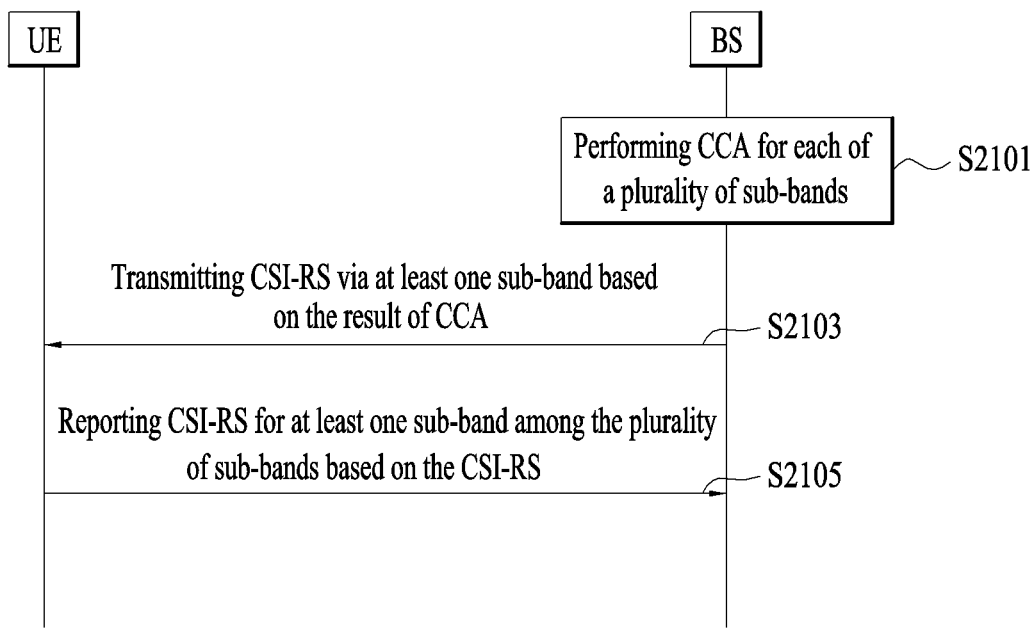

Based on the above features, the present disclosure proposes a method of transmitting, measuring, and reporting a CSI-RS in an efficient way when a system or BWP bandwidth wider than a frequency band for CCA (LBT sub-band) is configured FIGS. 19 to 21 are diagrams illustrating implementation examples of overall operations of a UE, a BS, and a network according to embodiments of the present disclosure.

Referring to FIG. 19, the BS may perform CCA for each of a plurality of LBT sub-bands (S1901) and transmit a CSI-RS to the UE in at least one LBT sub-band among the plurality of LBT sub-bands according to CCA results (S1903). How the BS performs the CCA in S1901 and/or transmits the CSI-RS in S1903 will be described in detail in Embodiments 1 and 4.

The BS may receive a CSI report on CSI measured based on the transmitted CSI-RS from the UE in at least one CSI sub-band (S1905). Details of the CSI report received by the BS and reporting methods therefor will be described in Embodiments 1 to 3. The at least one LBT sub-band in steps S1901 to S1903 may be equal to or different from the at least one CSI sub-band in step S1905. For example, the CSI-RS may be transmitted in several sub-bands among a plurality of sub-bands, but the CSI may be calculated and reported for the several sub-bands or all of the plurality of sub-bands. The above-described BS operations may be performed according to the following embodiments.

The BS according to the present disclosure may be any one of the various devices which will be described in FIGS. 25 to 27. For example, the BS may be a second wireless device 200 of FIG. 25 or a wireless devices 100 or 200 of FIG. 26.

Referring to FIG. 20, the UE may receive a CSI-RS in at least one LBT sub-band among a plurality of LBT sub-bands (S2201). How the UE receives the CSI-RS will be described in detail in Embodiments 1 and 4.

The UE may calculate CSI for at least one CSI sub-band among a plurality of CSI sub-bands based on the received CSI-RS and report the calculated CSI to the BS (S2203). How the UE calculates and reports the CSI will be described in detail in Embodiments 1 to 3.

The at least one LBT sub-band in step S2201 may be equal to or different from the at least one CSI sub-band in step S2203. For example, the CSI-RS may be transmitted in several sub-bands among a plurality of sub-bands, but the CSI may be calculated and reported for the several sub-bands or all of the plurality of sub-bands.

The UE according to the present disclosure may be any one of the various devices which will be described in FIGS. 25 to 27. For example, the UE may be a first wireless device 100 of FIG. 25 or the wireless devices 100 or 200 of FIG. 26.

FIG. 21 shows an implementation example of the overall network operations according to the present disclosure. Referring to FIG. 21, the BS may perform CCA for each of a plurality of LBT sub-bands (S2101) and transmit a CSI-RS to the UE in at least one LBT sub-band among the plurality of LBT sub-bands according to CCA results (S2103). How the BS performs the CCA in S2101 and/or transmits the CSI-RS in S2103 will be described in detail in Embodiments 1 and 4. The UE may receive the transmitted CSI-RS, calculate CSI for at least one CSI sub-band among a plurality of CSI sub-bands based on the received CSI-RS, and report the calculated CSI to the BS (S2105). How the UE calculates and reports the CSI will be described in detail in Embodiments 1 to 3.

The at least one LBT sub-band in steps S2101 to S2103 may be equal to or different from the at least one CSI sub-band in step S2105. For example, the CSI-RS may be transmitted in several sub-bands among a plurality of sub-bands, but the CSI may be calculated and reported for the several sub-bands or all of the plurality of sub-bands. The above-described BS operations may be performed according to the following embodiments.

Embodiment 1: CSI-RS Transmission and Reporting Method in Consideration of CCA Operation In Embodiment 1, methods of transmitting a wideband CSI-RS, which is transmitted in a bandwidth greater than an LBT sub-band bandwidth, and a CSI reporting method for each transmission method will be described. The CSI-RS in Embodiment 1 may be a non-zero power (NZP) CSI-RS.

(1) Embodiment 1-1

When the frequency band of the CSI-RS includes a plurality of LBT sub-bands, the CSI-RS may be transmitted only if a channel is determined to be idle for all LBT sub-bands. In this case, the LBT sub-band is different from a CSI sub-band for CSI reporting, and one CSI sub-band may be set smaller than one LBT sub-band.

1) Reporting Method 1 According to Embodiment 1-1

The CSI-RS measurement and reporting may be performed in the same ways as a CSI-RS reporting method defined for a licensed band. However, when the UE determines that the CSI-RS is DTX, the UE may explicitly report CSI-RS DTX for CSI. Here, the DTX means that the BS transmits no CSI-RS because a channel is determined to be busy by CCA.

The UE may operate as follows to explicitly indicate the DTX when reporting the CSI.

The UE transmits a lowest CQI value.

The UE separately defines an event called DTX and a bit field for reporting the DTX, and then reports the DTX in the field.

The UE separately defines an event called DTX and reports the DTX through specific states of existing fields.

In Reporting Method 1, additional overhead may occur due to the use of the bit field or specific states, but the BS may explicitly recognize the DTX detection capability of the UE and reflect the DTX detection capability when scheduling DL signals including the CSI-RS and/or PDSCH.

2) Reporting Method 2 According to Embodiment 1-1

The CSI-RS measurement and reporting may be performed in the same way as the CSI-RS reporting defined for a licensed band, but the UE may skip determining whether the CSI-RS is DTX, unlike Reporting Method 1. The reason for this is that the BS already knows whether the CSI-RS is transmitted or not.

According to Reporting Method 2, although the UE reports CSI measurement results to the BS, the BS may ignore the results because the BS already knows whether the CSI-RS is transmitted. In addition, the BS may apply previously reported CSI when scheduling DL signals including the CSI-RS and/or PDSCH.

(2) Embodiment 1-2

When the frequency band of the CSI-RS includes a plurality of LBT sub-bands, CCA operation may be performed for each LBT sub-band, and the CSI-RS may be transmitted in an LBT sub-band where a channel is determined to be idle. CSI reporting may be performed on one configured CSI-RS resource.

1) Reporting Method According to Embodiment 1-2

Since the CSI-RS is capable of being transmitted in a partial band, the CSI reporting may be similar to the method described in Embodiment 1. However, there are several issues to be further considered, and details thereof will be described in Embodiment 2.

2) Indication of LBT Sub-Band in which CSI-RS is Transmitted to Simplify CSI Reporting A signal or channel for explicitly notifying the UE of the LBT sub-band in which the CSI-RS is transmitted is defined. That is, the LBT sub-band in which the CSI-RS is transmitted may be provided to the UE through the defined signal or channel.

For example, the BS may define an initialization signal for each LBT sub-band and allow the UE to determine whether the CSI-RS is transmitted by detecting the initialization signal. For example, when detecting the initialization signal, the UE may explicitly know whether the CSI-RS is transmitted in a corresponding LBT sub-band. After the detection of the initialization signal, the UE may expect that the CSI-RS will be transmitted in the corresponding LBT sub-band.

When the UE autonomously determines whether the CSI-RS is transmitted based on detection of the initialization signal or blind detection of the CSI-RS, the detection reliability may be degraded if the channel quality is poor. Thus, the detection reliability may be provided through a specific signal and/or channel, for example, a CRC of a PDCCH.

In this case, since a resource for transmitting the CSI-RS is common for a UE group or an entire cell even though the CSI-RS is configurable for each UE, it may be desirable to inform whether the CSI-RS is transmitted for each LBT sub-band by using a group-common PDCCH (GC-PDCCH), which is used to provide information to the UE group or entire cell. The GC-PDCCH refers to a channel for transmitting information to a plurality of UEs. The GC-PDCCH may be used not only to inform the CSI-RS transmission but also to transmit information about whether the current channel of the corresponding cell is occupied and information about an occupied frequency band.

Upon receiving the GC-PDCCH, the UE may know whether the CSI-RS is transmitted and/or obtain information about the LBT sub-band in which the CSI-RS is transmitted. The UE may perform the CSI measurement and reporting based on the information. When detecting no GC-PDCCH, the UE may determine that the CSI-RS is transmitted in all LBT sub-bands. Alternatively, the UE may perform blind detection to directly determine whether the CSI-RS is transmitted.

In the case of an aperiodic CSI-RS, since whether the CSI-RS is transmitted is indicated by DCI, the LBT sub-band in which the CSI-RS is transmitted may be further indicated when it is indicated by the DCI included in the GC-PDCCH whether the CSI-RS is transmitted.

To guarantee that the CSI-RS is transmitted in all LBT sub-bands, it may be defined that the CSI-RS is transmitted only in a single transmission (transmit) opportunity (TXOP) or a discovery reference signal (DRS) transmission window, and information about the LBT sub-band in which the CSI-RS is transmitted may be regarded to be equal to information about a frequency band occupied by the TXOP.

The TXOP may mean a duration that allows access to a specific channel without contention for fair resource allocation. For example, the TXOP may mean a duration configured for a specific node to perform signal transmission from a time when a channel is determined to be idle.

The periodicity and offset of the DRS transmission window may be configured by the network through a signal such as an RRC message, but the TXOP may be configured by a specific UE or UE group through a dynamic signal such as the GC-PDCCH.

When there is no specific signal or channel defined to inform the UE whether the CSI-RS is transmitted, if the UE detects the PDCCH/PDSCH/initialization signal/TxOP, the UE may determine that the CSI-RS is transmitted in an LBT sub-band or frequency region in which the corresponding signal is detected.

3) Method of Determining Common Parameter

Even though a CQI or PMI is calculated for each LBT sub-band for the wideband CSI-RS, which is transmitted in a plurality of LBT sub-bands, one value may be assumed for a CRI, an RI, or a wideband PMI in general. Thus, there is a need for a method of determining common parameter(s) for the CRI, RI, and wideband PMI, and such a method may include the following.

The UE may be configured to report the common parameter separately. The common parameter may be determined based on LBT sub-bands where the LBT succeeds immediately before the common parameter is reported, and the determined common parameter may be applied to all LBT sub-bands. For example, referring to FIG. 23, when the common parameter is expected to be reported at a time t5, the common parameter may be determined based on LBT sub-bands where the LBT succeeds at a time t4, and applied to all of the first to fourth sub-bands. If the LBT succeeds in the first and third LBT sub-bands at the time t4, the common parameter may be determined based on the first and third LBT sub-bands, and applied to all of the first to fourth sub-bands. In this case, the common parameter may be reported for each CSI-RS resource, or a separate resource may be used to report the common parameter.

When the UE is not configured to report the common parameter separately, an update time may be configured for the common parameter. Then, the common parameter may be determined based on LBT sub-bands where the LBT succeeds immediately before the common parameter is reported, and the determined common parameter may be applied to all LBT sub-bands. For example, referring to FIG. 23, when the common parameter is expected to be updated at a time t5, the common parameter may be determined based on LBT sub-bands where the LBT succeeds at a time t4, and applied to all of the first to fourth sub-bands. If the LBT succeeds in the first and third LBT sub-bands at the time t4, the common parameter may be determined based on the first and third LBT sub-bands, and applied to all of the first to fourth sub-bands. In this case, the common parameter may be reported for each CSI-RS resource, or a separate resource may be used to report the common parameter.

The BS may configure a representative LBT sub-band, and the UE may determine the common parameter based on only the representative LBT sub-band and apply the common parameter to all LBT sub-bands. For example, referring to FIG. 23, when the BS sets the second LBT sub-band as the representative LBT sub-band, the UE may determine the common parameter based on the second LBT sub-band and apply the common parameter to the first and fourth LBT sub-bands.

The UE may autonomously determine the representative LBT sub-band on behalf of the BS. Then, the UE may determine the common parameter and apply the common parameter to all LBT sub-bands. In this case, the UE may select, as the representative LBT sub-band, an LBT sub-band expected to be used for PDSCH transmission due to a low channel load. In addition, the UE may select the representative LBT sub-band based on average channel characteristics of a predetermined number of LBT sub-bands. Further, the UE may select the representative LBT sub-band based on a region where a value measured by the ZP-CSI-RS or reference signal received power (RSSI) is lowest.

In the case of an aperiodic CSI-RS, stable transmission may be achieved in all bands due to the LBT, or information about an LBT sub-band in which the CSI-RS is transmitted may be indicated by DCI. Thus, the common parameter obtained from the aperiodic CSI-RS may be applied to all CSI reports using a periodic CSI-RS or semi-persistent CSI-RS, which is transmitted after the aperiodic CSI-RS.

When the CSI-RS is transmitted in a TXOP duration or DRS transmission window, the DRX probability depending on LBT failure may decrease. Thus, the value of the common parameter may be updated based on the CSI-RS transmitted in the TXOP duration or DRS transmission window, and then the updated common parameter may be applied to the CSI-RS transmitted in a next TXOP duration or DRS transmission window.

(3) Embodiment 1-3

When the CSI-RS is configured, a CSI-RS resource may be allocated for each LBT sub-band.

A CSI-RS reporting configuration may be configured for each CSI-RS resource, and the UE may perform the CSI measurement and reporting on each LBT sub-band. This may be similar to the convention operation in a licensed band in that multiple CSI resources and multiple CSI reporting configurations are configured.

When CSI is reported over the PUSCH or PUCCH, if the PUCCH and PUSCH are allocated to the same time resources, if simultaneous transmission thereof is not allowed, and if all information is capable of being transmitted on one resource among the PUCCH and PUSCH resources, the CSI may be reported on the corresponding resource. In this case, a resource capable of carrying more information may be selected.

However, when it is determined that all information is incapable of being transmitted on one resource, the CSI reporting may be performed according to predetermined priorities. When the priorities are determined, if a CSI resource is considered as DTX, related transmission may be dropped rather than transmitting information thereabout.

When there is an error regarding the location of an LBT sub-band determined by the UE as DTX, the BS may also have an error in interpreting CSI. Thus, information about which LBT sub-band or CSI sub-band is related to the CSI-RS and/or information whether the CSI-RS is transmitted or dropped may be provided together.

For example, a resource on which the CSI-RS is transmitted may be notified as described in Embodiment 1-2. To this end, the BS may inform the UE of the transmitted CSI-RS resource over the GC-PDCCH as described in Embodiment 1-2.

It may be assumed that only CSI-RS resources included in a frequency band occupied by the TXOP are transmitted. When no specific signal or channel is defined to inform whether the CSI-RS is transmitted, if the UE detects the PDCCH/PDSCH/initialization signal/TxOP, the UE may determine that the CSI-RS is transmitted in a corresponding LBT sub-band or frequency region.

When channel quality is measured for each of a plurality of CSI-RS resources and when CSI is reported based on the measured channel quality, information about a best beam, a rank, or a wideband PMI may vary for each LBT sub-band. In this case, if the BS transmits data to one UE over a wideband, information about the channel quality may be insufficient. For example, it is assumed that a BWP of 40 MHz is allocated to the UE and the size of each LBT sub-band is 20 MHz. If the measured rank is reported as 4 for one LBT sub-band and 2 for another LBT sub-band, how the rank is configured needs to be solved when the BS intends to transmit the PDSCH over the 40 MHz BWP. In addition, even if fixed to one of the two ranks, scheduling may be inaccurate because there is no CQI information about the fixed rank.

To solve such a problem, it may be desirable to use or assume common information about allocated CSI-RS resources for some information. That is, when a CQI or a preferred LBT sub-band PMI is calculated, one value may be assumed for a CRI, an RI, or a wideband PMI. Accordingly, there is a need for a method of determining common parameter(s) for the CRI, RI, and wideband PMI, and such a method may include the following.

The UE may be configured to report the common parameter separately. The common parameter may be determined based on LBT sub-bands where the LBT succeeds immediately before the common parameter is reported, and the determined common parameter may be applied to all LBT sub-bands. For example, referring to FIG. 23, when the common parameter is expected to be reported at a time t5, the common parameter may be determined based on LBT sub-bands where the LBT succeeds at a time t4, and applied to all of the first to fourth sub-bands. If the LBT succeeds in the first and third LBT sub-bands at the time t4, the common parameter may be determined based on the first and third LBT sub-bands, and applied to all of the first to fourth sub-bands. In this case, the common parameter may be reported for each CSI-RS resource, or a separate resource may be used to report the common parameter.

When the UE is not configured to report the common parameter separately, an update time may be configured for the common parameter. Then, the common parameter may be determined based on LBT sub-bands where the LBT succeeds immediately before the common parameter is reported, and the determined common parameter may be applied to all LBT sub-bands. For example, referring to FIG. 23, when the common parameter is expected to be updated at a time t5, the common parameter may be determined based on LBT sub-bands where the LBT succeeds at a time t4, and applied to all of the first to fourth sub-bands. If the LBT succeeds in the first and third LBT sub-bands at the time t4, the common parameter may be determined based on the first and third LBT sub-bands, and applied to all of the first to fourth sub-bands. In this case, the common parameter may be reported for each CSI-RS resource, or a separate resource may be used to report the common parameter.

The BS may configure a representative LBT sub-band, and the UE may determine the common parameter based on only the representative LBT sub-band and apply the common parameter to all LBT sub-bands. For example, referring to FIG. 23, when the BS sets the second LBT sub-band as the representative LBT sub-band, the UE may determine the common parameter based on the second LBT sub-band and apply the common parameter to the first and fourth LBT sub-bands.

The UE may autonomously determine the representative LBT sub-band on behalf of the BS. Then, the UE may determine the common parameter and apply the common parameter to all LBT sub-bands. In this case, the UE may select, as the representative LBT sub-band, an LBT sub-band expected to be used for PDSCH transmission due to a low channel load. In addition, the UE may select the representative LBT sub-band based on average channel characteristics of a predetermined number of LBT sub-bands. Further, the UE may select the representative LBT based on a region where a value measured by the ZP-CSI-RS or RSSI is lowest.

In the case of an aperiodic CSI-RS, stable transmission may be achieved in all bands due to the LBT, or information about an LBT sub-band in which the CSI-RS is transmitted may be indicated by DCI. Thus, the common parameter obtained from the aperiodic CSI-RS may be applied to all CSI reports using a periodic CSI-RS or semi-persistent CSI-RS, which is transmitted after the aperiodic CSI-RS.

When the CSI-RS is transmitted in a TXOP duration or DRS transmission window, the DRX probability depending on LBT failure may decrease. Thus, the value of the common parameter may be updated based on the CSI-RS transmitted in the TXOP duration or DRS transmission window, and then the updated common parameter may be applied to the CSI-RS transmitted in a next TXOP duration or DRS transmission window.

Preferably, which parameter among the above-described CRI, RI, and wideband PMI is used as the common parameter may be determined by the BS based on how scheduling and data channel transmission are performed. In addition, the BS may configure the common parameter for the UE. When there is no valid CSI-RS according to DTX detection for initial CSI reporting, a value applied to the common parameter may be predefined or provided while the CSI reporting is configured.

In addition, when the UE informs the BS of information about a CSI-RS resource used to determine the common parameter, the BS may use the information in the scheduling step. When it is determined that the CSI-RS is DTX for each LBT sub-band, the CSI reporting methods described in Embodiment 1-1 may be applied to CSI reporting for the corresponding LBT sub-band.

(4) Embodiment 1-4

The BS may inform the UE of CSI-RS transmission via the GC-PDCCH. To indicate whether the CSI-RS is transmitted, the BS may directly indicate whether the CSI-RS is transmitted via the GC-PDCCH or indicate the resource occupancy of the BS via the GC-PDCCH to indirectly indicate whether the CSI-RS is transmitted, as described embodiments 1-2 and 1-3. That is, when the BS informs that the BS occupies specific slots via the GC-PDCCH, the UE may assume that the CSI-RS is to be transmitted in the corresponding resources. In this case, the BS may also inform the occupancy of each LBT sub-band. The occupied slots should be DL or flexible slots rather than UL slots.

When the BS indicates whether the CSI-RS is transmitted via the GC-PDCCH, if the UE fails to detect the GC-PDCCH, the UE may assume that no CSI-RS is transmitted in a corresponding slot. That is, the UE may not need to perform CSI measurement on the corresponding slot.

Alternatively, if no GC-PDCCH is detected in all slots capable of indicating DL (or flexible) symbols included in slot #n, the UE may not need to perform the CSI measurement in slot #n. When the GC-PDCCH is configured to indicate DL/UL/flexible symbols and/or slots within a maximum of K slots, if a GC-PDCCH capable of indicating a DL (or flexible) symbol duration of slot #n is not detected from slot #(n−K+1) to slot #n, the UE may not need to perform the CSI measurement in slot #n.

When no GC-PDCCH is configured, the UE may be configured to perform the CSI measurement only on a resource to which the PDCCH or PDSCH is allocated in order to prevent system performance from being degraded due to blind detection. In this case, the UE may expect that measurement restrictions are set unconditionally. The resource to which the PDCCH or PDSCH is allocated may mean PDCCH symbols and/or scheduled PDSCH symbols, a slot including the corresponding symbols, or a frequency resource corresponding to LBT sub-bands including the PDCCH and/or scheduled PDSCH. Further, the UE may expect that no CSI measurement is performed on a cell/carrier/BWP/LBT sub-band where no GC-PDCCH is configured.

Embodiment 2: CSI-RS Reporting when CSI-RS is Transmitted in Partial Band

When a CSI-RS is allowed to be transmitted in a partial band, the UE may autonomously determine an LBT sub-band in which the CSI-RS is transmitted or obtain related information from the BS as described above. In this case, the UE may measure CSI for each LBT sub-band determined as non-DTX, and report a PMI or CQI for each LBT sub-band based on the measured CSI. When the CQI is reported, the CSI reporting method described in Embodiment 1-1 may be applied. If a report on CSI-RS DTX is explicitly transmitted together with the CSI, the CSI may be reported for each LBT sub-band. If the CSI-RS is determined as DTX in a specific LBT sub-band, the UE may drop to report CSI for the corresponding LBT subband or transmit CSI for another LBT sub-band on a corresponding CSI reporting resource (1) Embodiment 2-1: When UE Determines DTX for Each LBT Sub-Band In the NR system, even if a PMI/CQI is configured for each LBT sub-band, reporting of an RI and a wideband PMI/CQI may be requested. When the PMI/CQI per LBT sub-band is not valid or has no great significance, a DL signal may be scheduled by the wideband PMI/CQI.

In this case, if the DL signal is scheduled based on the channel quality of an LBT sub-band determined as DTX, there may be an error in the wideband PMI/CQI. Thus, when the UE determines DTX for each LBT sub-band, the wideband PMI/CQI may be calculated by excluding the LBT sub-band determined as DTX, i.e., the LBT sub-band for which CSI is invalid. If the UE is not configured to report CSI for each LBT sub-band, the UE may report the LBT sub-band determined as DTX when performing CSI reporting. The BS may use the information when scheduling DL signals.

If a specific LBT sub-band has a large load, the specific LBT sub-band is likely to be DTX compared to other LBT sub-bands. In this case, the BS may instruct the UE to exclude the specific LBT sub-band when reporting wideband CSI.

(2) Embodiment 2-2: When UE does not Determine DTX

Basically, since the UE does not determine LBT sub-bands in which no CSI-RS is transmitted, the UE may perform CRI/RI/PMI/CQI measurement for each LBT sub-band. In this case, if it is determined by the measured channel quality that data channel quality for each LBT sub-band is less than or equal to a predetermined threshold or a specific level configured by the BS with respect to a maximum or average value, CSI values measured in corresponding LBT sub-bands may not reflected when wideband CSI is calculated. While the data channel quality may generally correspond to throughput, a specific value may be used depending on the CQI.

In this case, the UE may be configured to report, to the BS, the LBT sub-bands which are not reflected when calculating the wideband CSI. Alternatively, the BS may use the corresponding information while performing scheduling. If a specific LBT sub-band has a large load, the specific LBT sub-band is likely to be DTX compared to other LBT sub-bands. In this case, the BS may instruct the UE to exclude the specific LBT sub-band when reporting wideband CSI. When a specific LBT sub-band has significant interference caused by a neighboring BS so that the channel quality therefor is poor as well as when the CSI-RS is determined as DTX, the corresponding LBT sub-band may not be considered when the wideband CSI is reported.

When the necessity of CSI measurement is determined for each LBT sub-band, it may be desirable to measure interference in an LBT sub-band where the CSI measurement is to be performed and apply the measured interference. That is, when it is determined whether to measure CSI for each LBT sub-band, it may be desirable to measure interference in the same LBT sub-band.

In Embodiment 2, it is described that an LBT sub-band determined as DTX or having channel quality less than a threshold is not considered in reporting wideband CSI. In this case, if specific information is not transmitted because the amount of resources for CSI reporting is limited, it may be desirable not to preferentially transmit information about a CSI sub-band related to the LBT sub-band which is not considered in the calculation of the wideband CSI.

Embodiment 3: CSI Reference Resource

In the NR system, a CSI reference resource for indicating CSI reporting may be defined as follows.

In the frequency domain, the CSI reference resource may be defined by a DL PRB group related to CSI calculation.

In the time domain, the CSI reference resource for reporting CSI in a UL slot n' may be defined as a single DL slot n-$n_{CSI\_ref}$, where $$n = \left\lfloor n' \cdot \frac{2^{\mu_{DL}}}{2^{\mu_{UL}}} \right\rfloor,$$

and $\mu_{DL}$ and $\mu_{UL}$ denote a DL SCS and a UL SCS, respectively.

For periodic and semi-persistent CSI reporting, if a single CSI-RS resource is configured for channel measurement, $n_{CSI\_ref}$ is the smallest value greater than or equal to $4*2^{\mu_{DL}}$, and the configured reference resource should be a valid DL slot.

If multiple CSI-RS resources are configured for channel measurement, $n_{CSI\_ref}$ is the smallest value greater than or equal to $5*2^{\mu_{DL}}$, and the configured reference resource should be a valid DL slot.

For aperiodic CSI reporting, if the UE is instructed by DCI to report CSI in the same slot as that where the CSI is requested, $n_{CSI\_ref}$ is a reference resource in the same valid DL slot as that where the CSI is requested. Otherwise $n_{CSI\_ref}$ is determined by $\lfloor Z'/N_{symb}^{slot} \rfloor$, where Z' corresponds to a delay requirement and the DL slot n-$n_{CSI\_ref}$ corresponds to a valid DL slot.

When a periodic or semi-persistent CSI-RS/CSI-IM or SSB is used for channel measurement and/or interference measurement, the UE may expect that the channel/interference measurement will not be performed from the last OFDM symbol of the CSI-RS/CSI-IM/SSB during Z' symbols before the transmission time of the first OFDM symbol for the aperiodic CSI reporting.

Among slots in a serving cell, a slot including DL or flexible symbols configured by higher layers and not corresponding to a measurement gap is regarded as a valid slot.

However, when a wideband CSI-RS is transmitted in an unlicensed band, the CSI-RS may be transmitted in some LBT sub-bands as described in Embodiment 1. In this case, a CSI reference resource may need to be determined or changed. For example, a CSI reference resource in an unlicensed band may be defined as follows.

(1) Embodiment 3-1: CSI Reference Resource in Frequency Domain

In Embodiment 1, it has been described that when a wideband CSI-RS is transmitted or when CSI-RS(s) are transmitted on a plurality of CSI-RS resources over a wideband, how the BS informs the UE of an LBT sub-band in which the CSI-RS is transmitted or a CSI-RS resource on which the CSI-RS is transmitted. A frequency-domain resource in which the CSI-RS is transmitted and a resource used to calculate a CSI value may be defined as a CSI reference resource in the frequency domain. Alternatively, when it is indicated that all LBT sub-bands related to a specific CSI-RS resource are transmitted in the frequency domain, all LBT sub-band may be defined as a valid CSI reference resource.

(2) Embodiment 3-2: CSI Reference Resource in Time Domain

It may be difficult to expect that a CSI-RS is stably transmitted in a region except a TX burst occupied by the BS. Thus, it may be desirable to use only CSI-RS resources in the TX burst occupied by the BS as valid CSI resources to receive the CSI-RS stably. Thus, when the CSI reference resource defined in the NR system is applied, it may be desirable to apply the definition of the CSI reference resource only to a slot including the CSI-RS resource existing in the TX burst. In other words, if there is no valid DL slot in a specific TX burst, every slot in the corresponding TX burst may not be defined as a valid DL slot. In addition, when measurement restrictions are configured, a specific slot included in the most recent TX burst including the CSI reference resource may be defined as a valid DL slot. For example, among DL slots or flexible slots that satisfy the definition of the valid DL slot in the NR system, DL slots or flexible slots included in the most recent TX burst may be defined as valid DL slots.

Embodiment 4: CSI-RS Transmission Method Based on Multiplexing with DRS

In the NR system, a CSI-RS may be used for RRM measurement. When the CSI-RS is used for the RRM measurement, multiple transmission positions may be defined for the CSI-RS, and the CSI-RS may be actually transmitted at one candidate CSI-RS transmission position among multiple candidate CSI-RS transmission positions depending on whether the LBT is successful as in the SSB, thereby achieving stable transmission of the CSI-RS.

When the candidate CSI-RS transmission position is included in the DRS window, the candidate CSI-RS transmission position may be determined as a relative position to the SSB. When the candidate CSI-RS transmission position is out of the DRS window, the candidate CSI-RS transmission position may be determined based on absolute slot and symbol indices.

When a CSI-RS sequence is generated, the CSI-RS transmission position may vary depending on whether the LBT is successful. As a result, a resource collision may occur between CSI-RSs, and the resource collision may also cause ambiguity. Therefore, when the CSI-RS sequence is generated, it may be desirable to use slot and symbol indices related to one specific candidate CSI-RS transmission position among candidate CSI-RS transmission positions, instead of using slot and symbol indices at which the CSI-RS is actually transmitted. Alternatively, the index of a QCLed SSB may be used for CSI-RS transmission without use the slot index and/or symbol index.

If the slot and symbol indices related to the one specific candidate CSI-RS transmission position are used to generate the CSI-RS sequence, the slot and/or symbol index of the first candidate CSI-RS transmission position among the candidate CSI-RS transmission positions may be used.

For the RRM measurement, it may be desirable to use filtering for CSI-RS measurement results. To this end, the transmission power of the CSI-RS may be fixed for all transmission positions, regardless of multiplexing with the DRS.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 24:
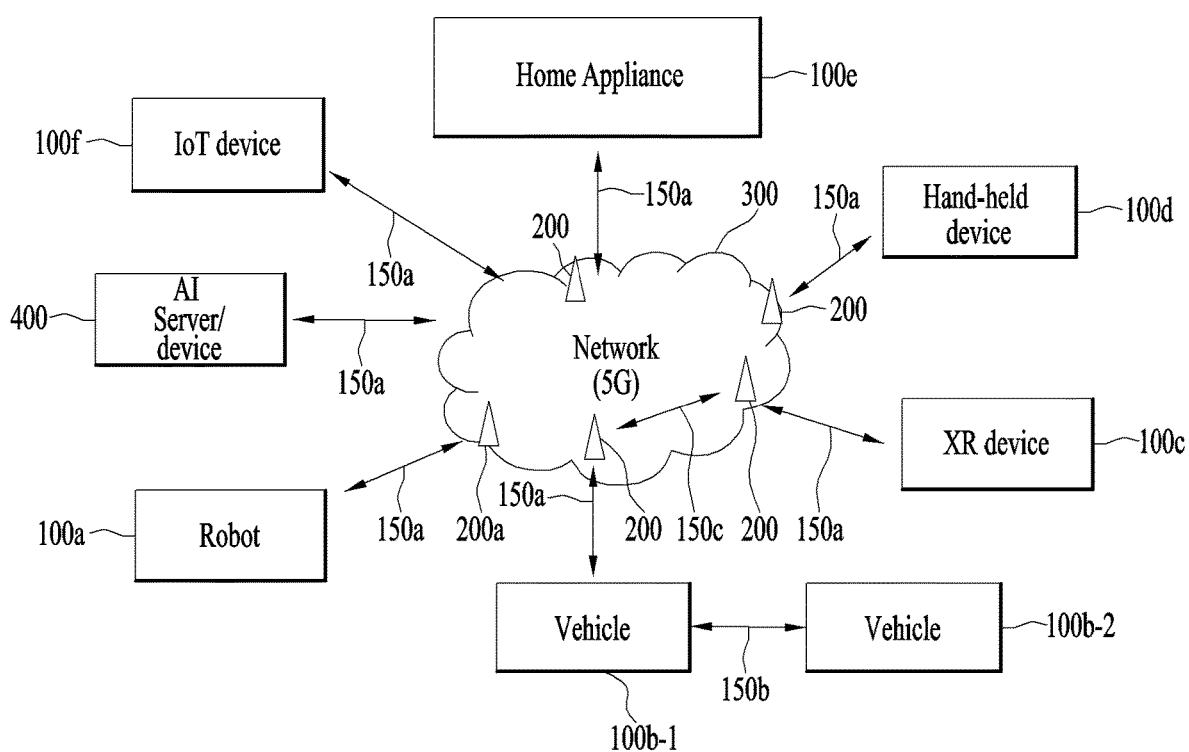
FIG. 24 illustrates an example of a communication system to which embodiments of the present disclosure are applied.

FIG. 24 illustrates a communication system 1 applied to the present disclosure.

Referring to FIG. 24, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., SL communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, SL communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 25:
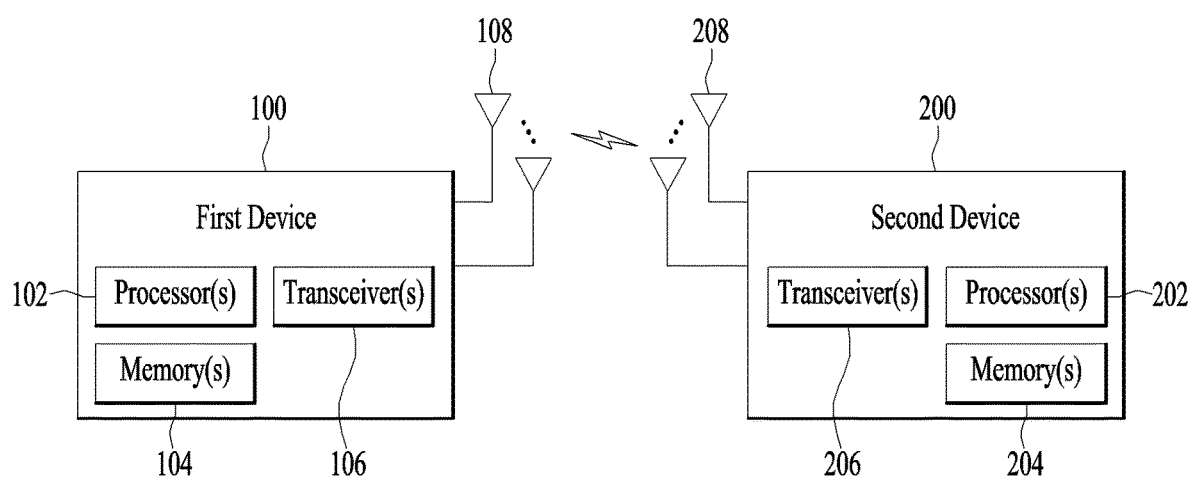
FIGS. 25 to 27 illustrate examples of various wireless devices to which embodiments of the present disclosure are applied.

FIG. 25 illustrates wireless devices applicable to the present disclosure.

Referring to FIG. 25, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 24.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Hereinafter, a description will be given of instructions and/or operations controlled by the processor(s) 102 and stored in the memory(s) 104 of the first wireless device 100 according to an embodiment of the present disclosure.

While the following operations are described in the context of control operations of the processor(s) 102 from the perspective of the processor(s) 102, software code for performing the operations may be stored in the memory(s) 104.

The processor(s) 102 may control the transceiver(s) 106 to receive a CSI-RS in at least one LBT sub-band among a plurality of LBT sub-bands. In this case, the processor(s) 102 may control the transceivers(s) 106 to receive the CSI-RS according to Embodiments 1 and 4.

The processor(s) 102 may calculate CSI for at least one CSI sub-band among a plurality of CSI sub-bands based on the received CSI-RS and control the transceiver(s) 106 to report the calculated CSI to the second wireless device 200. In this case, the processor(s) 102 may calculate and report the CSI according to Embodiments 1 to 3.

The at least one LBT sub-band may be equal to or different from the at least one CSI sub-band. For example, the CSI-RS may be transmitted in several sub-bands among a plurality of sub-bands, but the CSI may be calculated and reported for the several sub-bands or all of the plurality of sub-bands.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Hereinafter, a description will be given of instructions and/or operations controlled by processor(s) 202 and stored in memory(s) 204 of the second wireless device 200 according to an embodiment of the present disclosure.

While the following operations are described in the context of control operations of the processor(s) 202 from the perspective of the processor(s) 202, software code for performing the operations may be stored in the memory(s) 204.

The processor(s) 202 may perform CCA for each of a plurality of LBT sub-bands and control the transceiver(s) 206 to transmit a CSI-RS to the first wireless device 100 in at least one LBT sub-band among the plurality of LBT sub-bands according to CCA results. In this case, the processor(s) 202 may perform the CCA and transmit the CSI-RS according to Embodiments 1 and 4.

The processor(s) 202 may control the transceiver(s) 206 to receive a CSI report on CSI, which is measured based on the transmitted CSI-RS, from the first wireless device 100 in at least one CSI sub-band. In this case, the processor(s) 202 may receive the CSI report according to Embodiments 1 to 3, and details of the CSI report are described in Embodiments 1 to 3. The at least one LBT sub-band may be equal to or different from the at least one CSI sub-band. For example, the CSI-RS may be transmitted in several sub-bands among a plurality of sub-bands, but the CSI may be calculated and reported for the several sub-bands or all of the plurality of sub-bands. The overall operations of the processor(s) 202 including the above-described operations may be performed according to the following embodiments.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 26:
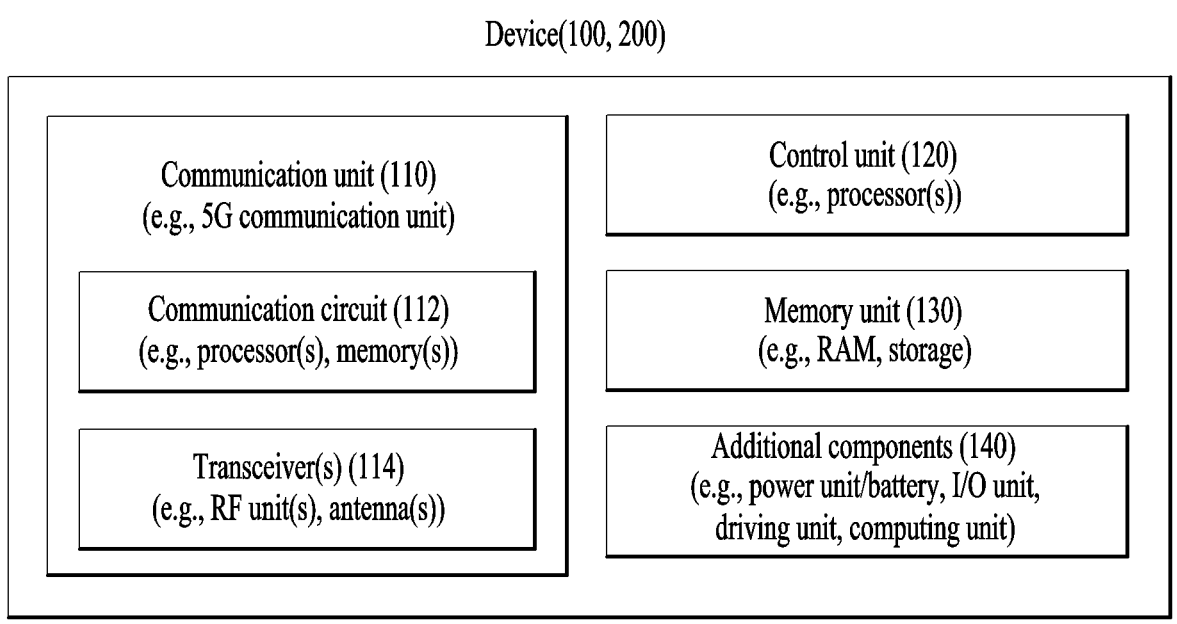

FIG. 26 illustrates another example of a wireless device applied to the present disclosure. The wireless device may be implemented in various forms according to a use case/service (refer to FIG. 24).

Referring to FIG. 26, wireless devices 100 and 200 may correspond to the wireless devices 100 and 200 of FIG. 25 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 24), the vehicles (100*b*-1 and 100*b*-2 of FIG. 24), the XR device (100*c* of FIG. 24), the hand-held device (100*d* of FIG. 24), the home appliance (100*e* of FIG. 24), the IoT device (100*f* of FIG. 24), a digital broadcasting terminal, a hologram device, a public safety device, an MTC device, a medical device, a FinTech device (or a finance device), a security device, a climate/environment device, the AI server/device (400 of FIG. 24), the BSs (200 of FIG. 24), a network node, or the like. The wireless device may be mobile or fixed according to a use case/service.

In FIG. 26, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 23:
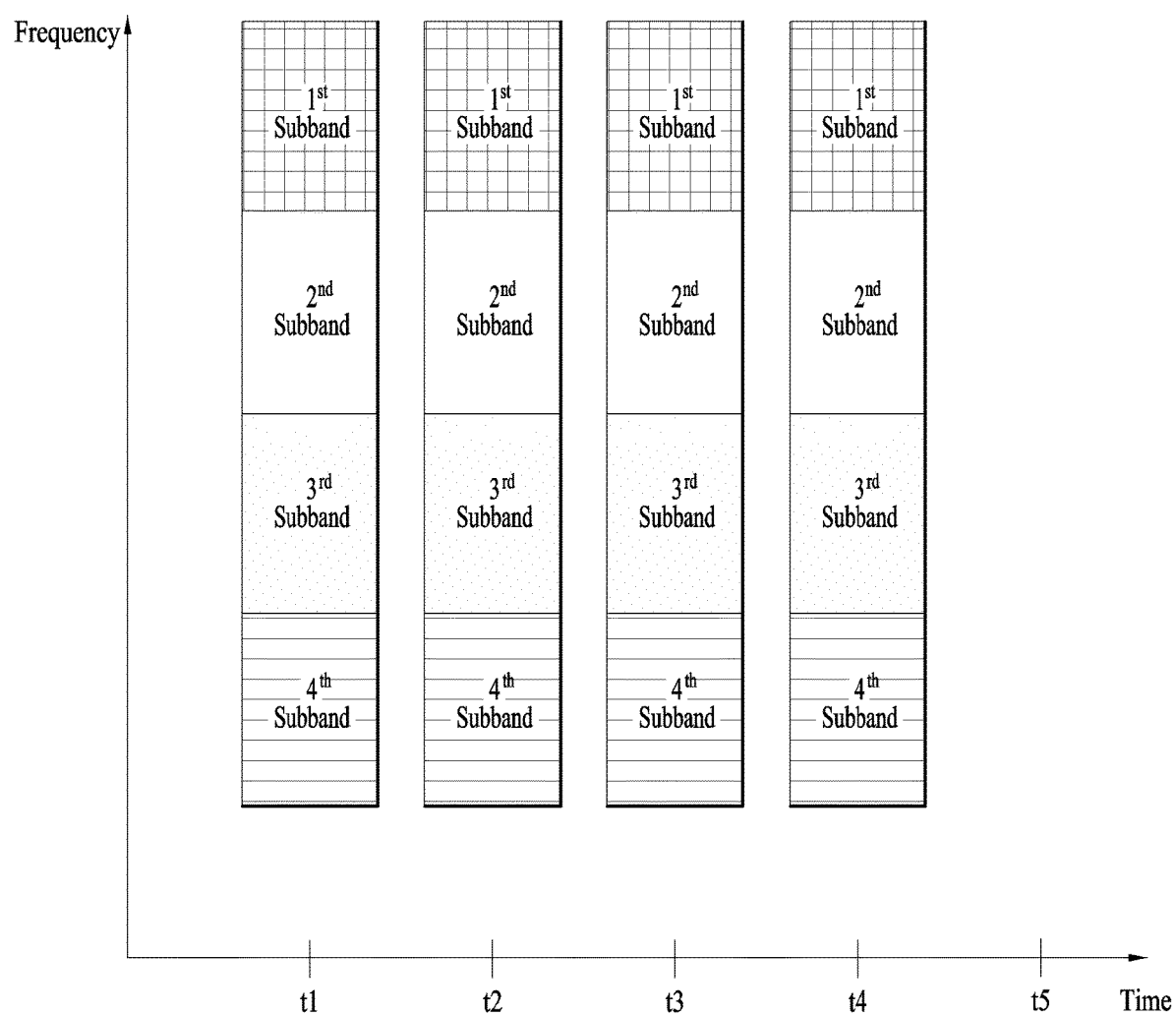
FIG. 23 is a diagram illustrating an implementation example of channel state information (CSI) reporting in an unlicensed band according to the present disclosure.

The implementation example of FIG. 23 will hereinafter be described with reference to the attached drawings.

Figure 27:
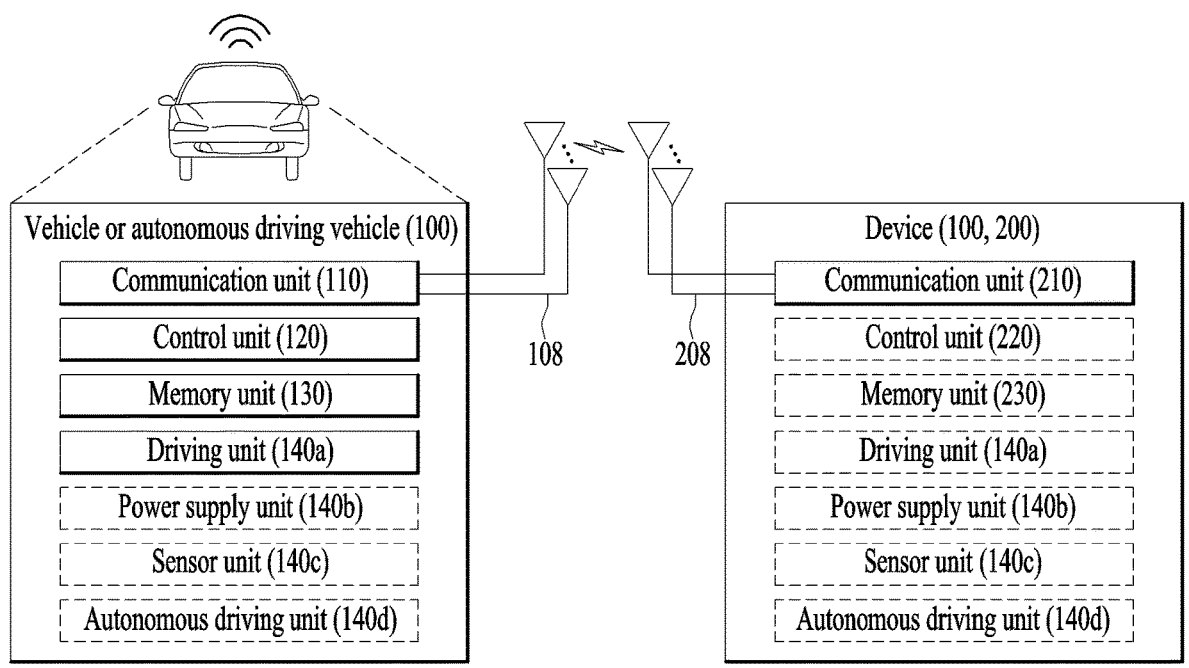

FIG. 27 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 27, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 28:
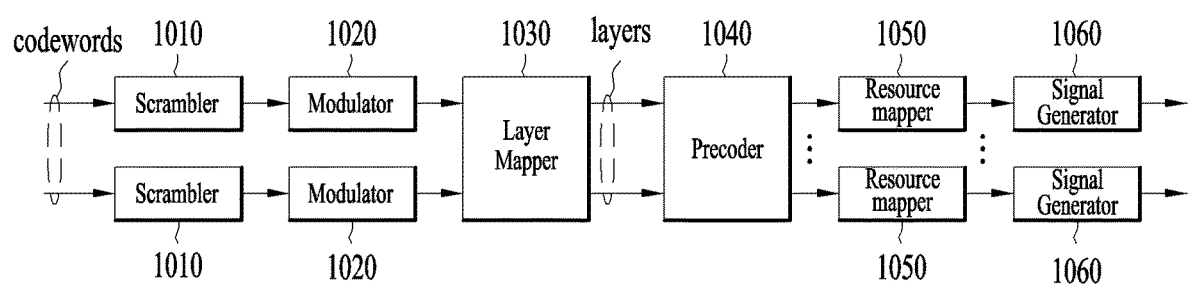
FIG. 28 illustrates an exemplary signal processing circuit to which embodiments of the present disclosure are applied.

FIG. 28 illustrates a signal processing circuit for Tx signals.

Referring to FIG. 28, a signal processing circuit 1000 may include a scrambler 1010, a modulator 1020, a layer mapper 1030, a precoder 1040, a resource mapper 1050, and a signal generator 1060. The operations/functions shown in FIG. 25 may be performed by the processors 102 and 202 and/or the transceivers 106 and 206 shown in FIG. 25, without being limited thereto. Hardware elements shown in FIG. 23 may be implemented by the processors 102 and 202 and/or the transceivers 106 and 206 shown in FIG. 25. For example, the blocks 1010 to 1060 may be implemented by the processors 102 and 202. In addition, the blocks 1010 to 1050 may be implemented by the processors 102 and 202 shown in FIG. 25, and the block 1060 may be implemented by the transceivers 106 and 206 shown in FIG. 25.

The codeword may be converted into a radio signal (or a radio frequency (RF) signal) through the signal processing circuit 1000 shown in FIG. 28. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK (pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

The signal processing steps for reception (Rx) signals in the wireless device may be arranged in the reverse order of the signal processing steps 1010 to 1060 shown in FIG. 28. For example, the wireless devices 100 and 200 (shown in FIG. 26) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method of transmitting and receiving a channel state information reference signal (CSI-RS) in an unlicensed band and device therefor have been described based on the fifth generation (5G) new radio access technology (RAT), the method and device are also applicable to various wireless communication systems as well as the 5G new RAT.

The invention claimed is:

1. A method for receiving a Channel State Information-Reference Signal (CSI-RS) by a user equipment (UE) in an unlicensed band, the method comprising:
    monitoring a Physical Downlink Control Channel (PDCCH) for scheduling a Physical Downlink Shared Channel (PDSCH); and
    based on a Group Common-PDCCH (GC-PDCCH) not being configured to the UE and based on the PDCCH being detected, receiving the CSI-RS in symbols to which the PDSCH is scheduled.

2. The method of claim 1, wherein, based on the PDCCH not being detected, the CSI-RS is not received.

3. The method of claim 1, wherein, based on the GC-PDCCH being configured to the UE, the CSI-RS is received in an occupied resource of the slot.

4. The method of claim 3, wherein the occupied resource of the slot is informed as a type of a downlink or a type of flexible.

5. A user equipment (UE) for receiving a Channel State Information-Reference Signal (CSI-RS) in an unlicensed band, the UE comprising:
- at least one transceiver;
- at least one processor; and
- at least one computer memory operably connectable to the at least one processor and storing instructions that, when executed by the at least one processor, perform operations comprising:
- monitoring a Physical Downlink Control Channel (PDCCH) for scheduling a Physical Downlink Shared Channel (PDSCH); and
- based on a Group Common-PDCCH (GC-PDCCH) not being configured to the UE and based on the PDCCH being detected, receiving, via the at least one transceiver, the CSI-RS in symbols to which the PDSCH is scheduled.

6. The UE of claim 5, wherein, based on the PDCCH not being detected, the CSI-RS is not received in the CSI-RS resource.

7. The UE of claim 5, wherein, based on the GC-PDCCH being configured to the UE, the CSI-RS is received in an occupied resource of the slot.

8. The UE of claim 7, wherein the occupied resource of the slot is informed as a type of a downlink or a type of flexible.

9. An apparatus for receiving a Channel State Information-Reference Signal (CSI-RS) in an unlicensed band, the apparatus comprising:
- at least one processor; and
- at least one computer memory operably connectable to the at least one processor and storing instructions that, when executed by the at least one processor, perform operations comprising:
- monitoring a Physical Downlink Control Channel (PDCCH) for scheduling a Physical Downlink Shared Channel (PDSCH); and
- based on a Group Common-PDCCH (GC-PDCCH) not being configured to the UE and based on the PDCCH being detected, receiving the CSI-RS in symbols to which the PDSCH is scheduled.

* * * * *